United States Patent [19]

Li et al.

[11] Patent Number: 4,720,863
[45] Date of Patent: Jan. 19, 1988

[54] METHOD AND APPARATUS FOR TEXT-INDEPENDENT SPEAKER RECOGNITION

[75] Inventors: Kung-Pu Li, LaJolla; Edwin H. Wrench, Jr., San Diego, both of Calif.

[73] Assignee: ITT Defense Communications, Nutley, N.J.

[21] Appl. No.: 439,010

[22] Filed: Nov. 3, 1982

[51] Int. Cl.[4] .................................................. G10L 1/00
[52] U.S. Cl. ..................................... 381/42; 364/513.5
[58] Field of Search ................... 381/4, 37, 41, 42, 43, 381/44, 45; 364/513, 513.5

[56] References Cited

U.S. PATENT DOCUMENTS

| Re. 31,188 | 3/1983 | Pirz et al. | 381/43 |
| 4,092,493 | 5/1978 | Rabiner et al. | 381/42 |
| 4,191,853 | 3/1980 | Riesinger | 381/4 |
| 4,292,471 | 9/1981 | Kuhn et al. | 381/42 |
| 4,301,329 | 11/1981 | Taguchi et al. | 381/37 |
| 4,343,969 | 8/1982 | Kellett | 381/45 |
| 4,389,540 | 6/1983 | Nakamura et al. | 381/41 |
| 4,426,551 | 1/1984 | Komatsu et al. | 381/41 |
| 4,472,832 | 9/1984 | Atal et al. | 381/40 |
| 4,488,243 | 12/1984 | Brown et al. | 381/43 |

OTHER PUBLICATIONS

IEEE Trans. on Audio and Electroacoustics, vol. AU-21, No. 3, 6/73, pp. 140-141, Makhoul.
Abstract for Proceedings of the 1981 IEEE International Conference on Acoustics, Speech and Signal entitled, "Speaker Independent and Verification Combined with Speaker Independent Word Recognition, by A. E. Rosenberg and K. L. Shipley.
Abstract for an IEEE Transactions on Acoustics Speech and Signal Processing entitled, "On Creating Reference Templates for Speaker Independent Recognition of Isolated Words" by L. R. Rabiner.
Independent Recognition of Isolated Words", by L. R. Rabiner.
Atal, B. S. (1974), "Effectiveness of Linear Prediction Characteristics of the Speech Waves for Automatic Speaker Identification and Verification," J. Acoust. Soc. Amer., vol. 55, pp. 1304-1312, 1974.
Atal, B. S. (1976), "Automatic Recognition of Speakers from their Voices," Proceedings of the IEEE, vol. 64, pp. 460-475, Apr. 1976.

(List continued on next page.)

Primary Examiner—Salvatore Cangialosi
Attorney, Agent, or Firm—Robert A. Walsh; Thomas N. Twomey; Mary C. Werner

[57] ABSTRACT

A method and apparatus for recognizing an unknown speaker from a plurality of speaker candidates. Portions of speech from the speaker candidates and from the unknown speaker are sampled and digitized. The digitized samples are converted into frames of speech, each frame representing a point in an LPC-12 multi-dimensional speech space. Using a character covering algorithm, a set of frames of speech is selected, called characters, from the frames of speech of all speaker candidates. The speaker candidates' portions of speech are divided into smaller portions called segments. A smaller plurality of model characters for each speaker candidate is selected from the character set. For each set of model characters the distance from each speaker candidate's frame of speech to the closest character in the model set is determined and stored in a model histogram. When a model histogram is completed for a segment a distance D is found whereby at least a majority of frames have distances greater D. The mean distance value of D and variance across all segments for both speaker and imposter is then calculated. These values are added to the set of model characters to form the speaker model. To perform recognition the frames of the unknown speaker as they are received are buffered and compared with the sets of model characters to form model histograms for each speaker. A likelihood ratio is formed. The speaker candidate with the highest likelihood ratio is chosen as the unknown speaker.

16 Claims, 10 Drawing Figures

Markel, J. D. and Davis, S. B. (1979), "Text Independent Speaker Recognition from a Large Linguistically Unconstrainted Time-Spaced Data Base," IEEE Trans. on Acoustics, Speech, and Signal Processing, vol. ASSP-27, pp. 74–82, Feb. 1979.

Markel, J. D., Oshika, B. T., and Gray, A. H., Jr. (1977) "Long-Term Feature Averaging for Speaker Recognition," IEEE Trans. on Acoustics, Speech, and Signal Processing, vol. ASSP-25, pp. 330–337, Aug. 1977.

Wohlford, R. E., Wrench, E. H., and Landell, B. P. (1980), "A Comparison of Four Techniques for Automatic Speaker Recognition," Proc. ICASSP-80, vol. 3, pp. 908–911, 1980.

Wrench, E. H. (1981), "A Realtime Implementation of a Text Independent Speaker Recognition System," Proc. ICASSP-81, vol. 1, pp. 193–196 (1981).

Li, K. P., and Hughes, G. W. (1974), "Talker Differences as they Appear in Correlation Matrices of Continuous Speech Spectra," J. Acoust. Soc. Amer., vol. 55, pp. 833–837, Apr. 1974.

Wakita, H. (1976), "Residual Energy of Linear Prediction Applied to Vowel and Speaker Recognition," IEEE Trans. on Acoustics, Speech, and Signal Processing, vol. ASSP-24, pp. 270–271, 1976.

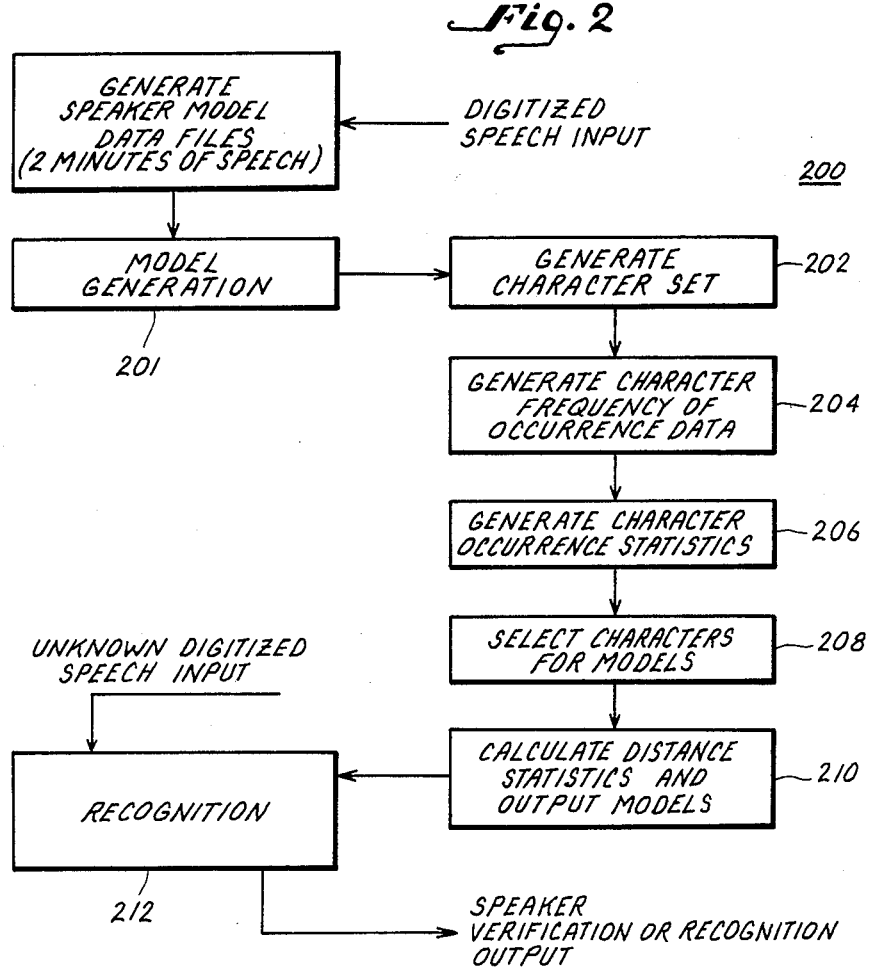
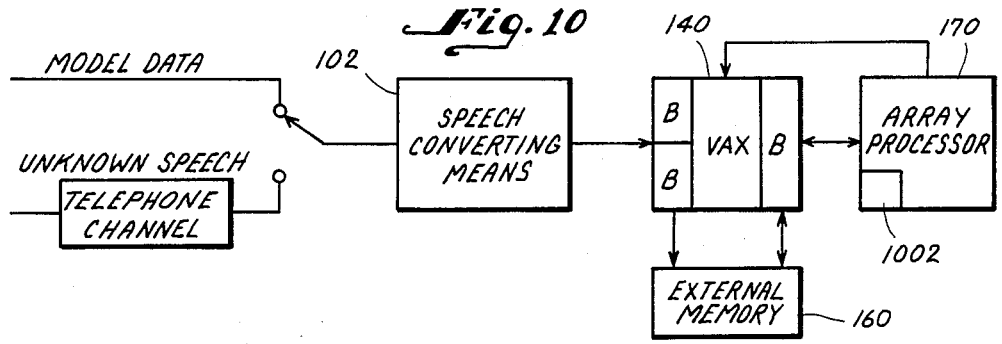

PLOT OF 'SIMULATED CHANNEL'

METHOD AND APPARATUS FOR TEXT-INDEPENDENT SPEAKER RECOGNITION

The Government has rights in this invention pursuant to Contract F30602-81-C-0134 awarded by Department of the Air Force.

BACKGROUND OF THE INVENTION

This invention relates to the general field of voice processing and more particularly to a method and apparatus for recognition of a speaker independent of the text being spoken.

Previous text-independent speaker recognition systems have used long term averages of various speech parameters to model a talker's voice. These techniques therefore require large amounts of speech for both modeling and recognition in order to estimate accurately the mean and variance of the speech parameters. In addition, the systems are very sensitive to channel variations that distort the long term average. Both these limitations have restricted the development of text-independent speaker recognition systems for many tactical applications.

SUMMARY OF THE INVENTION

The present invention overcomes the above-mentioned problems by using individual short duration speech frames from a speaker as models of that speaker's voice. Each frame characterizes a particular speech production of the speaker. Model frames are discarded that represent speech events that do not occur frequently in the modeling data. Recognition is based on frame by frame measurements rather than long term averages, so that large amounts of speech are not required. Input frames from the unknown speech whose speaker is to be recognized which are not close to any of the model frames are ignored. In this way reliable recognition can be achieved even if new speech events that did not occur in the model data are encountered in the speech data being recognized. It is also an advantage that the modeling technique above described is much less sensitive than previous techniques to changes in the channel over which the speech is obtained.

BRIEF DESCRIPTION OF THE DRAWINGS

Above-mentioned and other features and objects of this invention will become more apparent by reference to the following description taken in conjunction with the accompanying drawings, in which:

FIG. 2 is a block diagram showing the steps of the preferred method of carrying out the present invention.

FIG. 10 is an alternate block diagram of the invention of FIG. 1 showing model speech data and unknown speech data being received over separate channels.

DETAILED DESCRIPTION OF THE INVENTION

Figure 1:
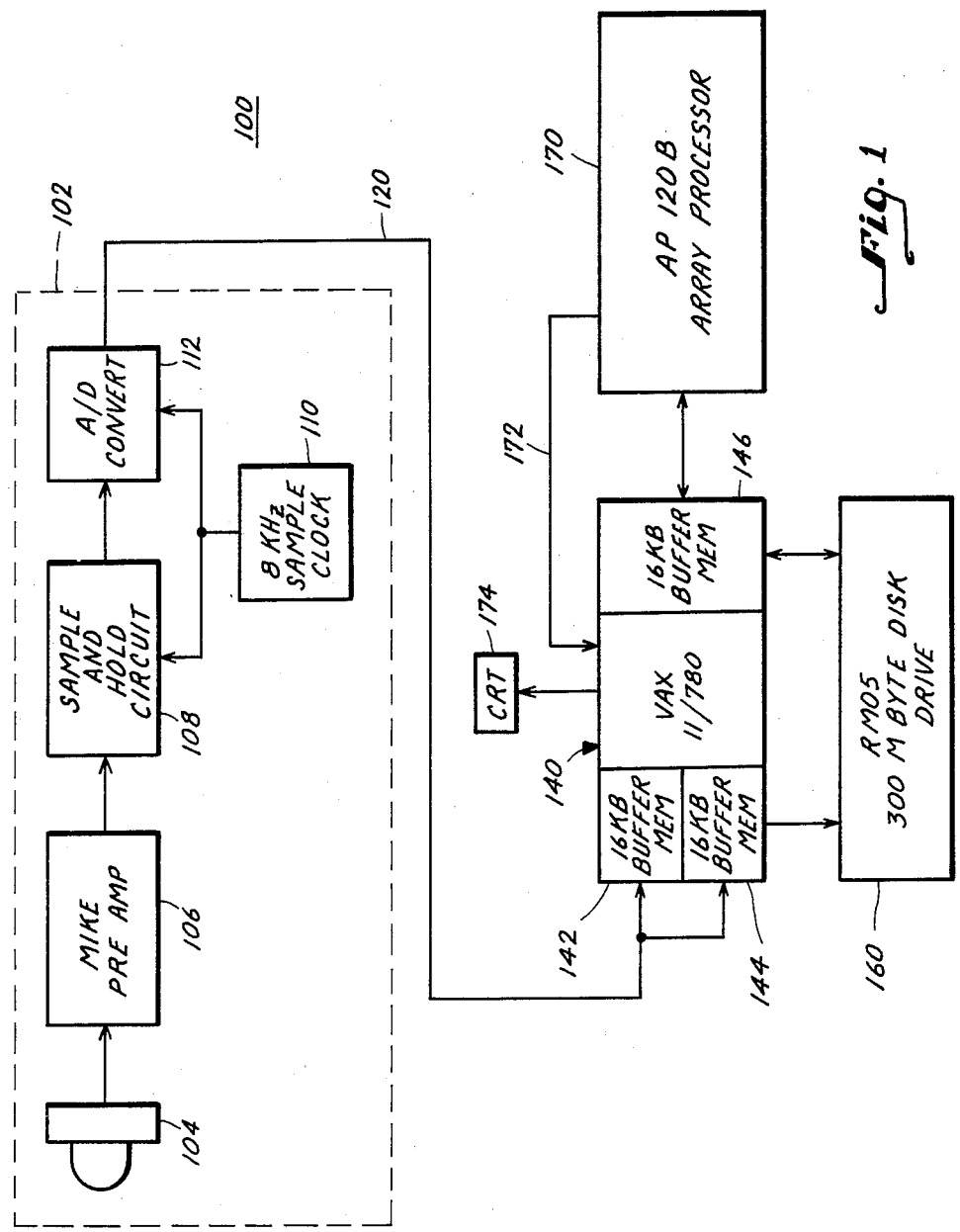
FIG. 1 is a block diagram of the preferred embodiment speaker recognition apparatus.

FIG. 1 is a block diagram of the preferred embodiment text-independent speaker recognizer apparatus designated generally 100. The invention performs recognition in two steps: first, digitized and processed samples (frames) of speech for each speaker candidate (in general, the apparatus and method is capable of recognizing a plurality of speakers, e.g. 11) are selected for use as speaker models which models are then stored; and, second, each frame of speech from an unknown speaker to be recognized is compared with each frame in the stored speaker models to recognize the unknown speaker. An important part of the recognition process is in determining which speech samples to use as speaker models.

In the preferred embodiment, the data used to generate the speaker models comprises two minutes of speech (a speaker data file) from each of eleven speaker candidates, with each two minutes being divided into 12 ten second segments of speech. Apparatus 100 comprises speech converting means designated generally 102 connected by bus 120 to general processor designated 140. General processor 140 is coupled to external memory 160 and special processor 170. Speech enters apparatus 100 as audio signals through the microphone 104 where it is subsequently amplified by mike preamp 106 of conventional design. Next, the audio is sampled by conventional sample and hold circuitry 108 8000 times per second in response to signals from an 8 kHz sample clock 110. The output of sample and hold circuit 108 is analog to digital (A/D) converted by A/D circuit 112 (again in response to signals from 8 kHz clock 110) to produce 16 bit pulse code modulated (PCM) signal samples. The PCM signals are transmitted via bus 120 to general purpose processor 140 where they are double buffered in 16 kilobyte buffer memories 142 and 144. Approximately one second of 8 kHz 16 bit PCM samples can be stored in a 16 kilobyte buffer memory. The speech samples are then transmitted to external memory 160 where they are stored for further processing in the special processor 170. A suitable memory is an RM05 300 megabyte disk drive.

The first step in generating speaker model data is to convert the raw PCM data into frames of speech data. This is done by taking approximately 200 sequential PCM samples and, using well known linear predictive coding (LPC) techniques to model the human vocal tract (See "Linear Prediction: A Tutorial Review", by J. Makhoul, Proceedings of IEEE, April 1975, Volume 63 No. 4, pages 561–580; and "Linear Prediction of Speech", by J. P. Markel and A. H. Gray, Jr., Springer-Verbg, 1976), converting these samples into an LPC twelve coefficient frame of speech. Them taking the last 100 PCM samples in time from the first conversion and combining it with the next 100 PCM samples in time, a new LPC-12 frame is formed. Each LPC-12 frame is a point in a multidimensional speaker space which is a speaker spacer which models the speaker's vocal tract. Approximately, one second of data is transferred at a time from memory 160 via 16 kilobyte buffer memory 146 for processing in special processor 170. In the preferred embodiment special processor 170 is a Floating Point System AP120B Array Processor equipped with 4K words of its own program memory for storing the LPC program and the model generation and recognition programs and 64K 38 bit words of data memory. Each speaker data file is processed as above described to generate speaker model data comprising LPC frames for each speaker. The data is then stored in the external memory 160.

Figure 3:
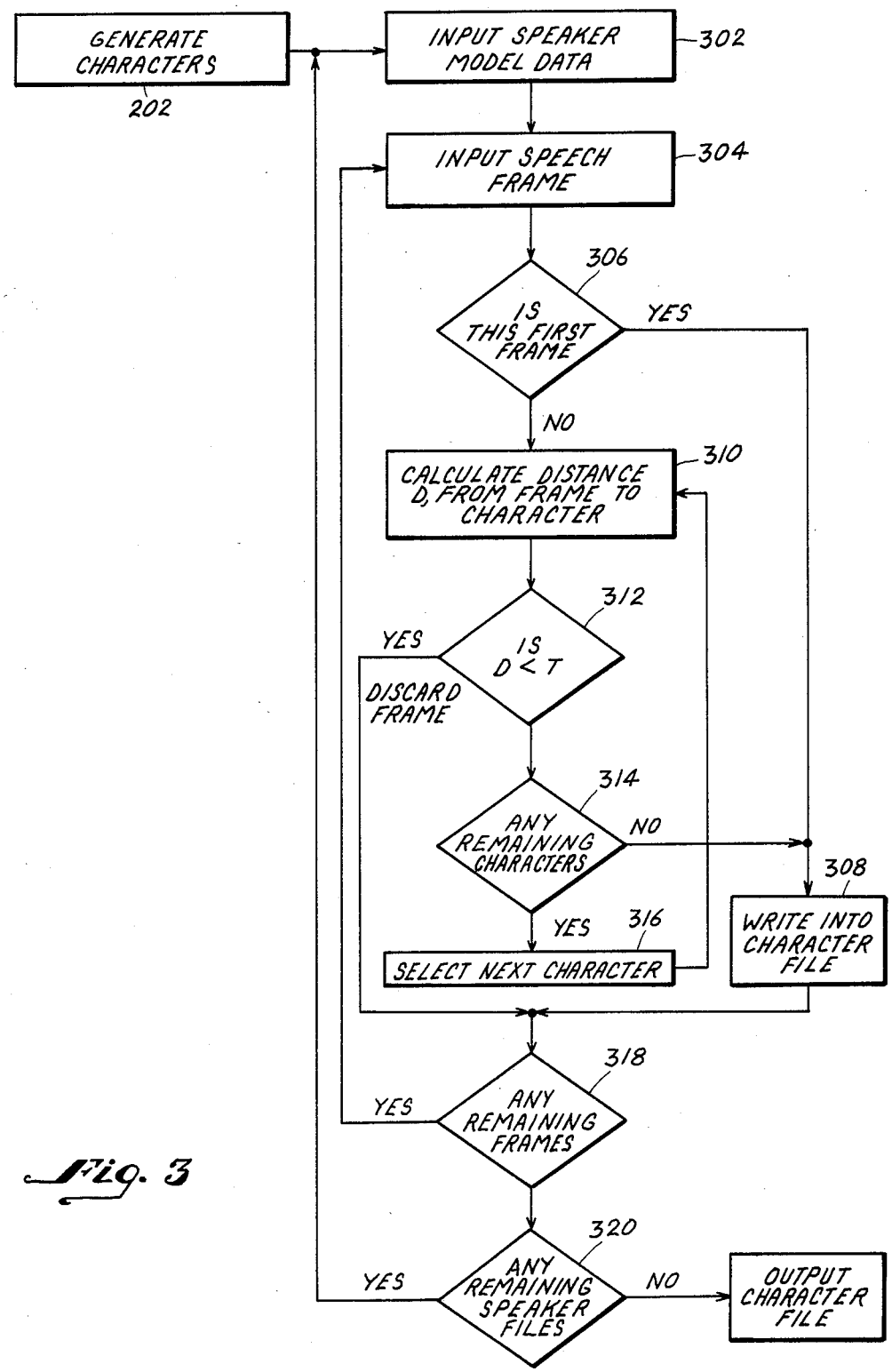
FIG. 3 is a more detailed block diagram of the step of generating a character set shown in FIG. 2.

Referring now to FIG. 2, a block diagram flow chart 200 of the process of recognizing a speaker from the digitized speaker data files is presented. Firstly, a character set is generated 202 by discarding many of the frames of data selecting a finite number of them as representative of the speaker field. The selected frames known as a character set are selected from the speaker model data from all eleven speakers by using a character covering algorithm which insures that no two characters selected as representative of the speaker field will be separated by a distance less than a predetermined amount, T. One suitable method for determining the distance between characters in the speaker field is the well known Itakura distance metric. In the preferred embodiment, T equals 1.5 Itakura units. Further details on generating a character set are shown in FIG. 3. Speaker model data for one of the speakers is inputted 302 from external memory 160. Characters are generated frame by frame 304. The first frame of the first speaker's model data becomes a character and then a new frame is processed 306 and 308. The distance from each new frame to all previously selected characters is determined 310 until either D is less than T in which case the frame is discarded and a new frame processed or the determination is made that the current frame should be a new character since the distances from the frame to all previous characters are greater than or equal to T 312, 314 and 316. All the frames for each speaker's model data are processed in this way 318 and 320. The result is a character set representative of the speaker field for the speakers chosen in which no two frames are closer than T. In the preferred embodiment apparatus and method of the present invention, this results in a character set numbering typically 1000 characters.

Figure 4:
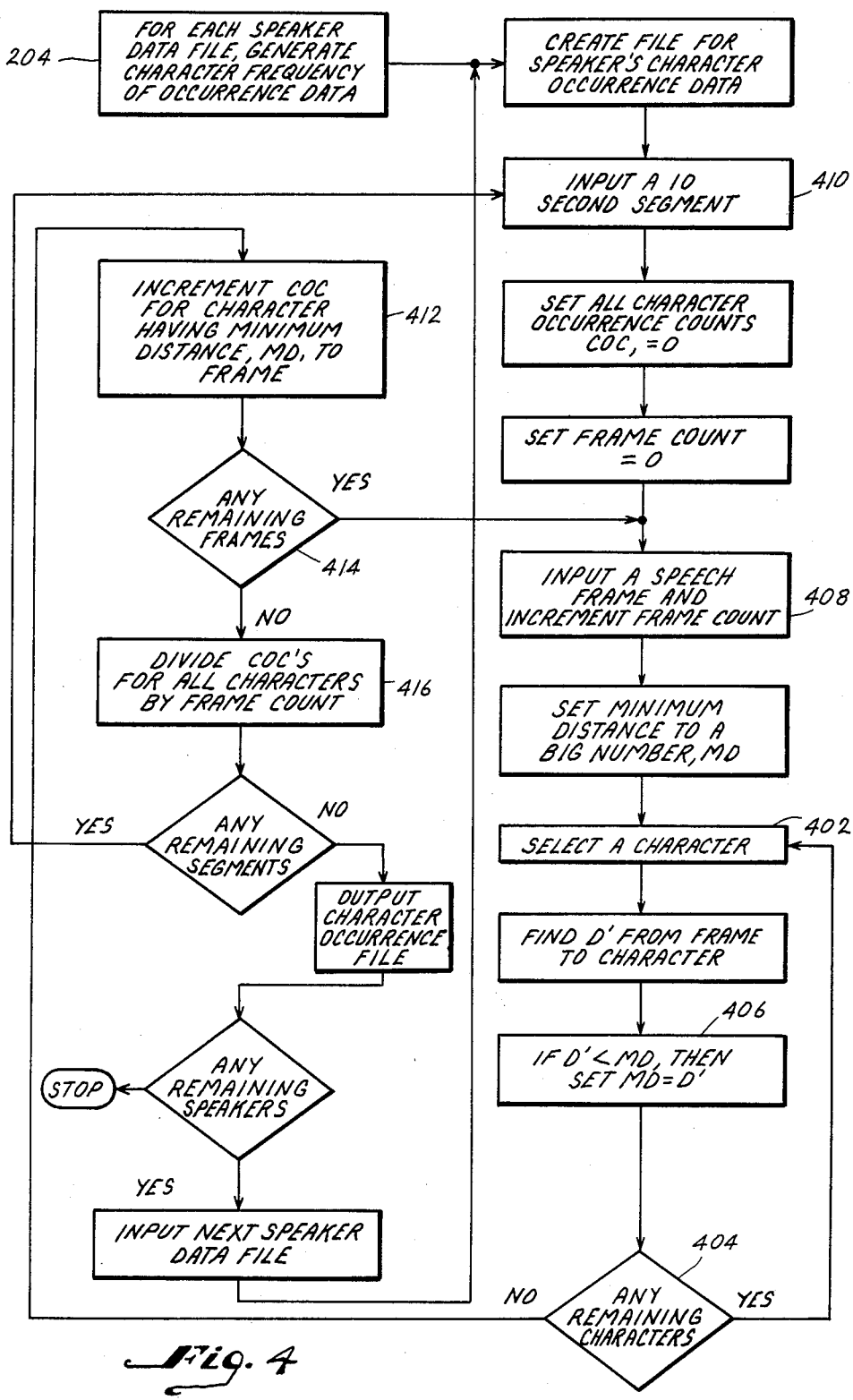
FIG. 4 is a more detailed block diagram of the step of generating character frequency of occurrence data shown in FIG. 2.

Referring now to FIGS. 2 and 4, the next step in speaker recognition after generating a character set for all eleven speakers is to generate character frequency of occurrence data 204 for each speaker's model data separately. Details of this step are given in FIG. 4. The number of times each character 402 in the character set 404 is the closest character 406 to the current frame 408 of a 10 second segment of speech 410 is determined 412 for each previously selected speaker data file. The character occurrence data is normalized by the number of frames processed within each 10 second segment 414, 416. When all the segments have been processed for a selected speaker data file, a new speaker data file is inputted from remote memory 160 into the array processor 170 along with the character set for processing. The result of this is character occurrence data for each of 12 10 second segments for each individual speaker.

Figure 5:
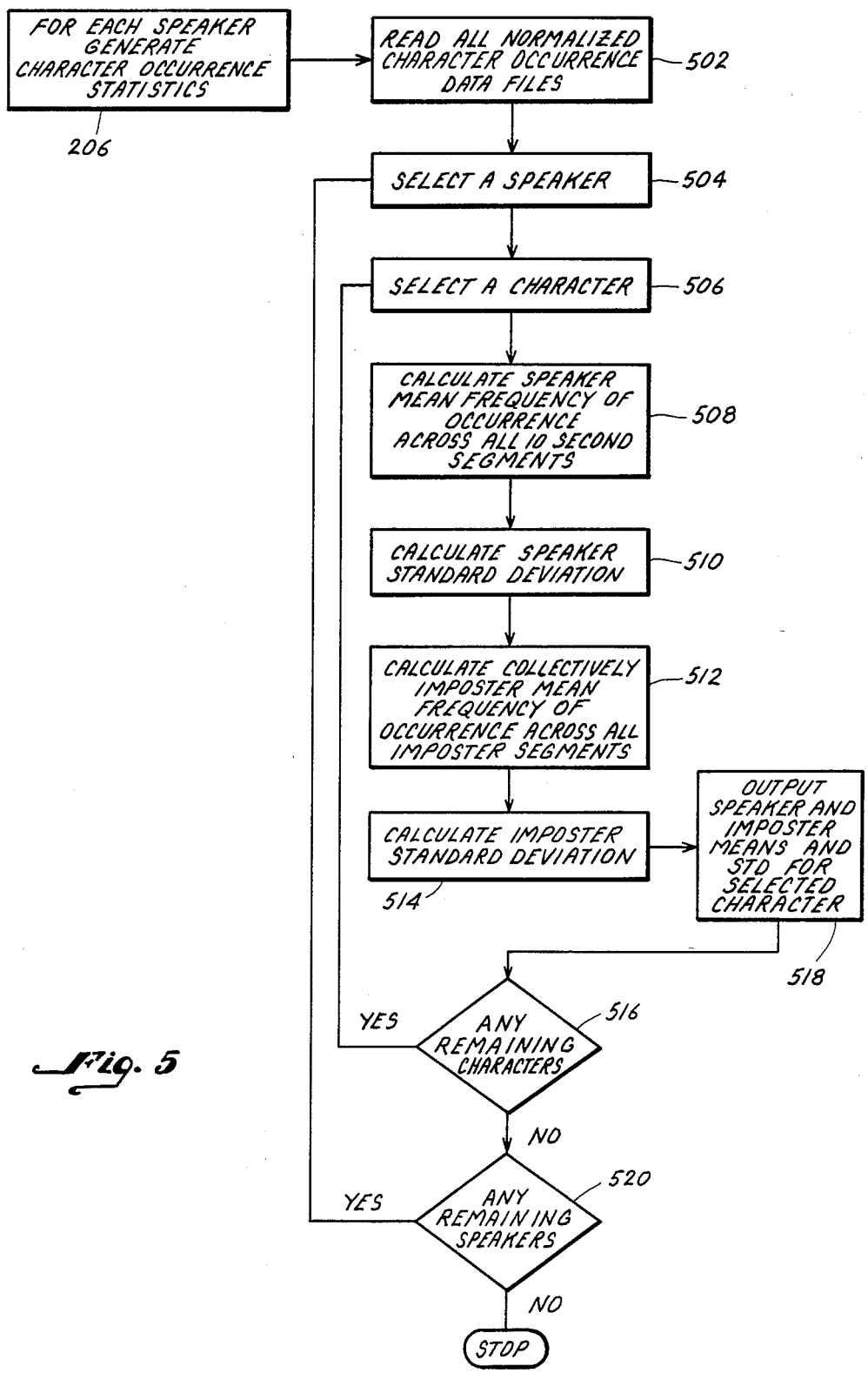
FIG. 5 is a more detailed block diagram of the step of generating character occurrence statistics shown in FIG. 2.

Referring now to FIGS. 2 and 5, the character occurrence data is processed to generate character occurrence statistics 206. This step is shown in more detail in FIG. 5. All of the normalized character occurrence data is read into the general purpose processor 140 from the disk drive 160, step 502 in FIG. 5. One of the eleven speakers is chosen as speaker 504 and the remaining speakers become collectively the imposters. Then for each character in the character set 506 the mean frequency of occurrence of that character across all 10 second segments of the speaker's data file is determined 508. The normalized frquency of occurrence data is used for this purpose. For example, suppose character No. 1 was the character with minimum distance to 8 of the frames in the first 10 second segment, there being approximately 800 frames in each 10 second segment. Then the normalized character occurrence for character No. 1 for that 10 second segment is 0.01. Similarly, character No. 1 would have values for each of the eleven other 10 second segments for the speaker data file. The mean frequency of occurrence would be the sum of normalized character occurrence data for character No. 1 for the speaker divided by 12, the number of 10 second segments in the speaker's data file. Next, using the mean value just calculated, the speaker standard deviation is calculated 510 in a conventional manner. Finally, for character No. 1, the mean frquency of occurrence across all 10 second segments for the imposter (all speaker data files not chosen as the speaker) is calculated from the normalized character occurrence data for character No. 1 512. For example,.the sum would be divided by 120 since there are ten remaining speakers, each with 12 10 second segments. Using the imposter mean, the imposter standard deviation is calculated 514 as above. The speaker and imposter mean and standard deviation for each character in the set 516 is determined in similar manner. For each character the speaker and imposter mean and standard deviation are saved 518. When all characters have been processed, a new one of eleven speaker data files is chosen and the remaining 10 become collectively the imposter and the above process is repeated 520. This is repeated until each of the speaker data files has been treated as the speaker with the remaining data files collectively being the imposter.

Figure 6:
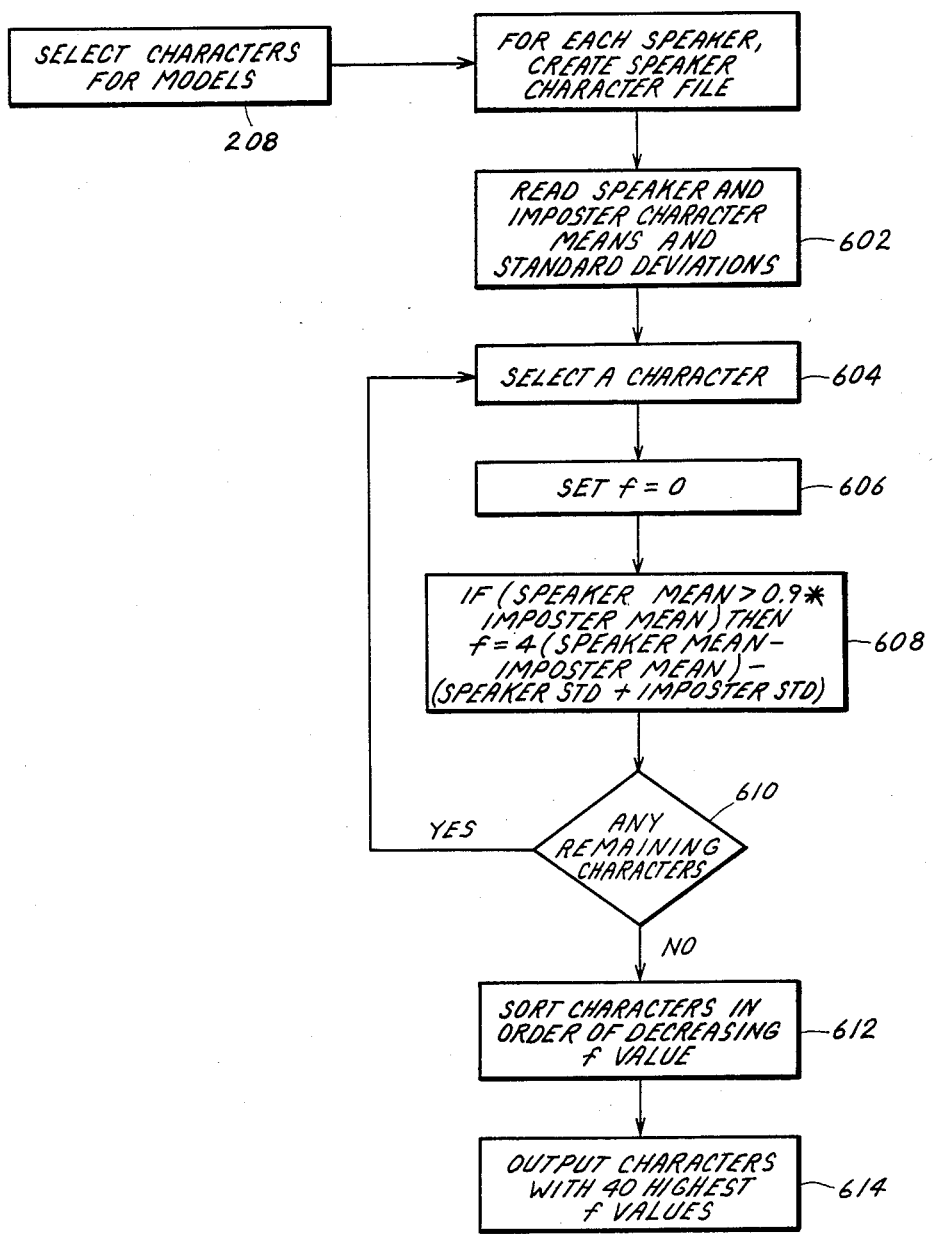
FIG. 6 is a more detailed block diagram of the step of selecting model characters shown in FIG. 2.

It should be remembered that in the preferred embodiment the character set used to represent the speaker field for the eleven speakers contained approximately 1000 characters. These 1000 characters are not particularly identified with any one of the eleven speakers. Using the character occurrence statistics generated by steps 204 and 206, a model set of characters for each speaker is selected which distinguishes that speaker from the remaining speakers 208. Referring to FIG. 6, this step is shown in more detail. All of the speaker and imposter character means and standard deviations data is inputted into general processor 140, see step 602. One of the speakers is selected as speaker and then a character from the character set of 1000 characters is selected 604. A parameter f is set equal to zero 606 and the speaker mean and imposter mean for the selected character is examined. If the speaker mean is greater than 0.9 times the imposter mean then f is set equal to $$f = 4 * (\text{speaker mean} - \text{imposter mean}) \div (\text{speaker standard deviation} + \text{the imposter standard deviation}).$$

See step 608. This process is repeated for each of the 1000 characters in the character set 610. Then those characters with the forty highest f values are chosen as the speaker's model characters 612 and 614. Then a new speaker is selected and new model characters are generated until all speakers have their own model characters.

Figure 7:
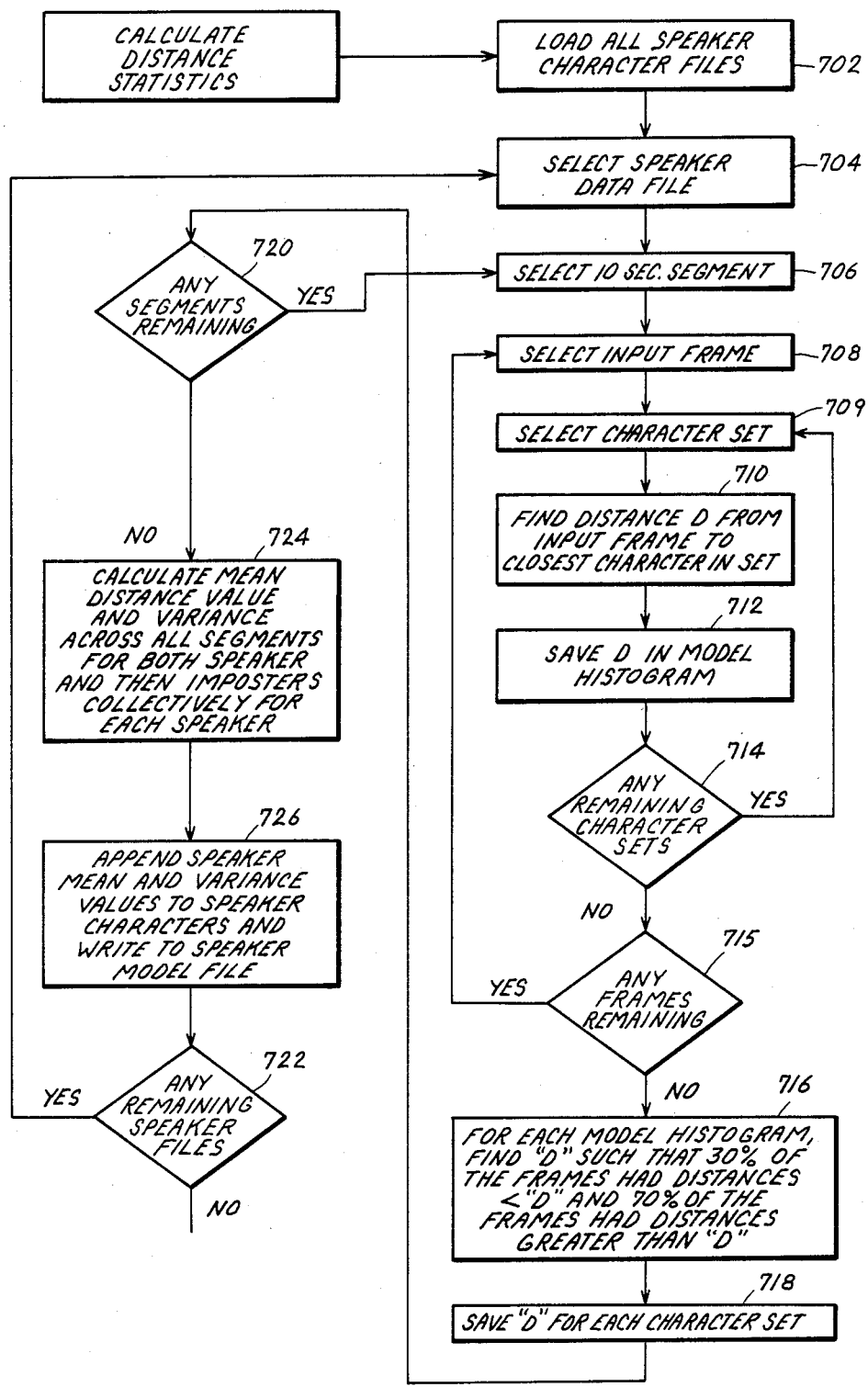
FIG. 7 is a more detailed block diagram of the step of calculating distance statistics shown in FIG. 2.

A final step in generating a speaker model before recognition is effected is to generate distance statistics for an output model for each speaker 210. This final step in model generation is shown in detail in FIG. 7. All speaker character files are loaded into array processor 170, see step 702. Then one of eleven speaker data files is selected and loaded into array processor 704. An input frame 708 of a selected ten second segment 706 is chosen and the distances, D, from the input frame to the closest character in each of the eleven speakers' model character sets are determined and saved in a model histogram, one for each set of model characters 709, 710, 712 and 714. The remaining frames in the selected segment are similarly processed 715. (A model histogram is a frequency distribution of the distances D measured.)

For each completed segment, for each model histogram, the distance, "D", such that 30% of the frames had distances less than "D" and 70% of the frames had distances greater than "D" is determined 716. The values "D" for each character set for each segment are saved 718. When all of the segments for the selected speaker data file are completed 720 the speaker whose data file was processed becomes the speaker and the remaining speakers are imposters. Then the mean distance value of "D" and variance of "D" across all speaker segments is calculated and then the mean distance value and variance across the imposters are calculated 724. These values are appended to the selected speaker's set of model characters to form a speaker model. The above processing is repeated for each of the speaker data files in turn to form eleven speaker models.

Figure 8:
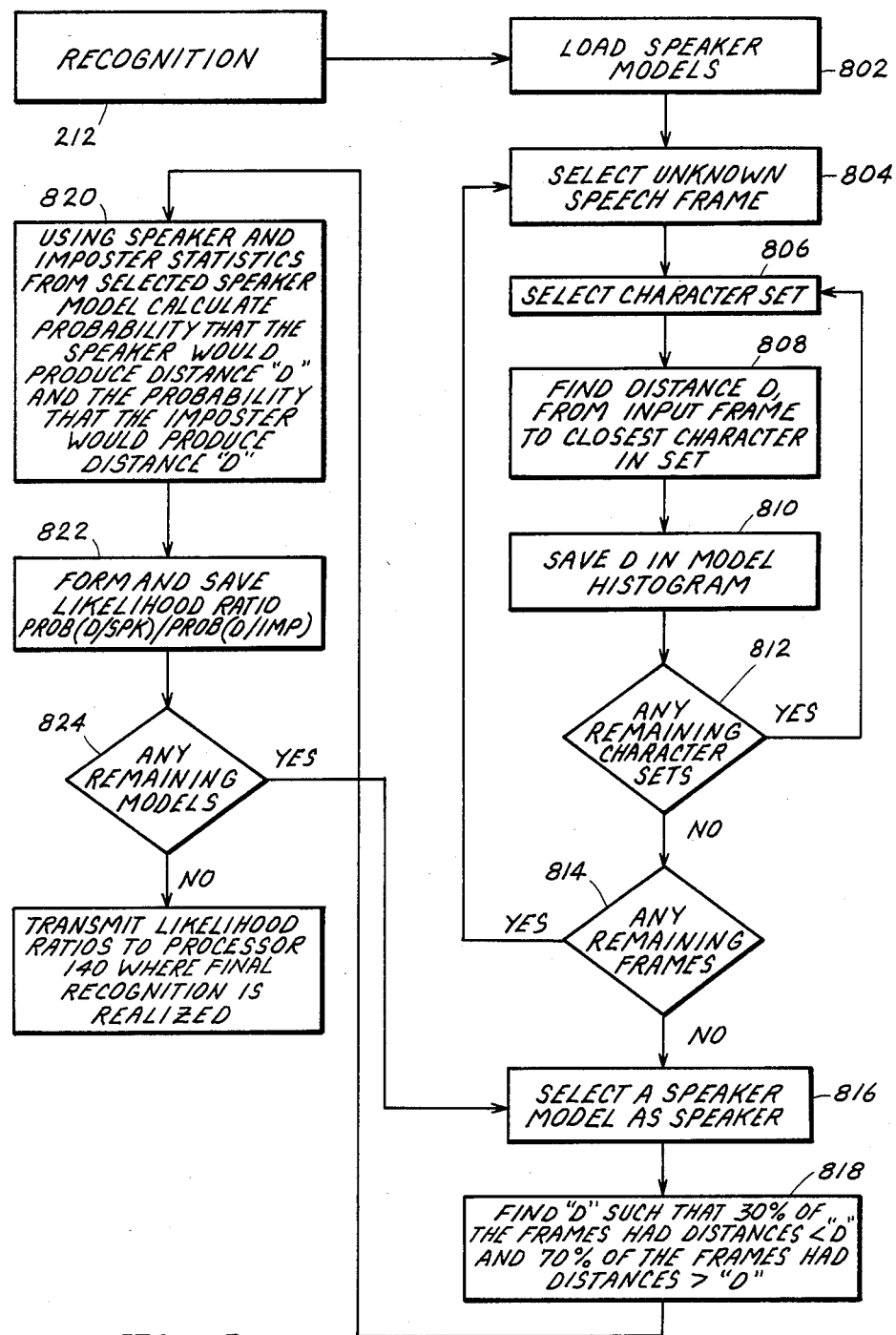
FIG. 8 is a more detailed block diagram of the final step of recognition shown in FIG. 2.

This completes the model generation phase 201 of the speaker recognition process. The final step of recognition of an unknown speaker 212 is shown in more detail in FIG. 8. All of the speaker models (40 characters plus statistics per model) are loaded into the array processor 170, see step 802. As the speaker to be recognized is speaking, a frame from the unknown speech is selected 804 and the distance from the frame to the closest character for each speaker model is determined and saved in a model histogram 806, 808, 810 and 812, there being a histogram for each speaker model. When all of the frames from the available segment (unknown length possibly less than ten seconds) of unknown speech have been processed as above 814, one of the eleven speaker models is selected as speaker 816 and the distance value "D" for that model's histgram such that 30% of the frames had distances less than "D" and 70% of the frames had distances greater than "D" is determined 818. Then, using the speaker and imposter statistics (mean values and variances contained in the speaker model), the probability that the selected speaker (step 816) would produce the distance "D" just determined, Prob (D/Spk), and the probability that an imposter would produce the distance "D", Prob (D/Imp), are calculated in conventional manner from first principles of probability theory 820 assuming Gaussianly distributed distances. Next, the likelihood ratio Prob (D/Spk)/Prob (D/Imp) is formed and saved 822. Then a new one of the eleven speaker models is chosen as speaker and a new likelihood ratio is determined as described above. This is repeated until each of the eleven speaker models has served as the speaker.

The likelihood ratios are transmitted via bus 172 to the general processor 140 (VAX 11/780) where the speaker with the highest likelihood ratio is selected 826. In the embodiment shown in FIG. 1, the selected speaker's identification or name is then displayed on a CRT 174.

It should be remembered that one suitable method for determining the distance between one frame (character) and another is the Itakura method for determining the distance metric. This method can be used wherever a distance is to be determined as described above in connection with a description of the Figures.

The above described apparatus and method is expected to provide short utterance speaker recognition capability, i.e., within a one second delay of the utterance a speaker can be recognized where the utterance lasts approximately ten seconds. Furthermore, it was demonstrated that high recognition accuracies (approximately 96%) can be obtained even where the speaker data used for the models and the test data to be recognized were recorded one week apart (as long as the channels over which the speech data, both model and test data, are communicated are approximately the same for both).

Figure 9:
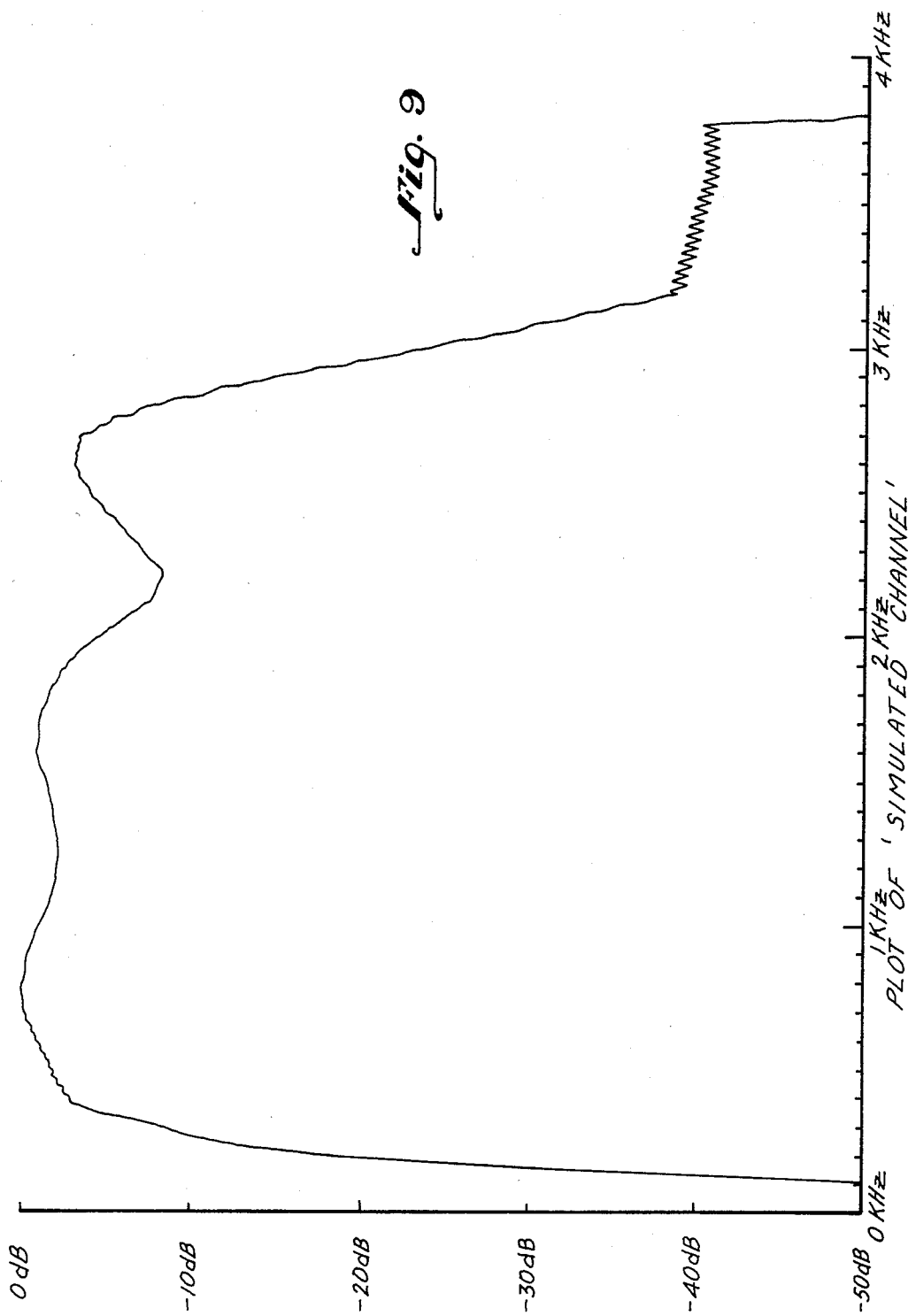
FIG. 9 is a curve of the telephone channel simulator 1000 shown in FIG. 10.

The above described method and apparatus works well even where the channel for the unknown differs from that of the model data. For example, speaker data files were processed with a channel simulator to model passing the data through a typical telephone channel. The bandwidth of the channel was approximately 500–3000 Hz with about seven db of ripple in the pass band. See FIG. 9. As FIG. 10 shows, the unknown speech input passes through the telephone channel 1000 before entering the apparatus while the model data enters 102 directly. An added processing step, blind deconvolution 1002, is added to the PCM samples before LPC-10 conversion in the Array Processor. This is a well known technique employed in telephony to provide channel normalization. However, in so doing in prior art speaker recognition systems the blind deconvolution also tends to normalize speaker characteristics making the prior art speaker recognition techniques useless or much less effective. Test results of the present invention indicate that for a 10 second long unknown utterance, recognition accuracy only drops from 96% where there is no channel differences between model data and test data recordings to 89% where channel differences were present and blind deconvolution was employed.

The source code for the program implementation of the steps described herein is provided on Pages 13–47. The source code is made up of four different languages: for the programs executed in the VAX processor 140 (those listings having a title ending in XXXX.C) the source code is written in the "C" language; for the programs executed in the array processor there are two types:

(a) source code written in Array Processor Assembly Language (those listings having a title ending in XXXX.APS), and (b) source code written in "C-Vector Function Chainer Language" (those listings having a title ending in XXXX.V); and make-file code listings. All array processor code was compiled and assembled using a software package available from APUNIX, a software company located in San Diego, California.

While the present invention has been disclosed in connection with the preferred embodiment thereof, it should be understood that there may be other embodiments which fall within the spirit and scope of the invention as defined by the following claims.

```
SOURCES = lpc.h spkrec.c
APSOURCES = apmain.v match.aps minchr.aps atob.aps itak.aps dot.aps
OBJECTS = spkrec.o apmain.o
LIBES =    -IV -lm
CFLAGS = -L -O
```

| | | |
|---|---|---|
| spkrec: | $(OBJECTS) | |
| | cc $(OBJECTS) $(LIBES) -o spkrec | *spkrec* |
| spkrec.o: | spkrec.c lpc.h | |
| apmain.o: | apmain.apb match.apb minchr.apb atob.apb itak.apb dot.apb | |
| | apal apmain.apb minchr.apb match.apb atob.apb itak.apb dot.apb -IV | |
| apmain.apb: | apmain.v lpc.h | |
| | cap -I. apmain.v | |
| match.apb: | match.aps lpc.h | |
| | apsify -I. match.aps | |
| minchr.apb: | minchr.aps lpc.h | |
| | apsify -I. minchr.aps | |
| itak.apb: | itak.aps | |
| | apal -c itak.aps | |
| dot.apb: | dot.aps | |
| | apal -c dot.aps | |
| atob.apb: | atob.aps | |
| | apal -c atob.aps | |
| listing: | | |
| | vgrind Makefile $(SOURCES) $(APSOURCES) & | |

```

/*
 *       Main Data Memory Addresses
 */
#define AHMIN       97
#define AHMAX       98
#define OUTCNT      99
#define LPCBUF      100
#define ANC         300
#define RPTR        301
#define APTR        314
#define J1          327
#define J2          340
#define J3          353
#define BUFA        400
#define START       4800
#define INBUF       5000
#define CHRNUM      9500
#define HBASE       9530
#define ICHR        14531
#define RCHR        14532
#define BCHR        14545

/*
 *       Table Mememory Addresses
 */
#define MINPOW      4096
#define TOL         4097
#define WINDOW      4100

/*
 *       Numbers of things
 */
#define SIZE        200
```

```c
#define NAR          13
#define NN           28
#define FSKIP        100
#define BUFSIZE      4400
define HSIZE        128 define MINHVAL      .5
define MAXHVAL      3.5

#include     <sys/types.h>
#include     <sys/stat.h>
include     <stdio.h> include     "lpc.h"

define PI2     (2*3.14159265)

#define   MAXMODEL     30
define MAXPERCENTS    8 struct statstruct{
        float    spkmean;
        float    spksdv;
        float    impmean;
        float    impsdv;
        short    percentvalue;
        }stats[MAXMODEL][MAXPERCENTS];
int index_decission = 3;          /*default % value of 30% set in rnorm*/
int nostats = 0;
int numpercents;
short apbuf[BUFSIZE];
short hbuf[HSIZE * 30];
int nmodels;
FILE *outfd;
int ninput;
char **mfiles;
char **ifiles;
char *outfile;
char *pname;

main(argc, argv)
        int argc;
        char **argv;
{
        int i, j, infd;
        int start,length,nbytes, bytesremaining, savestart;
        short junk,ndata,nout;
        float windval[SIZE],x,tol,minpow,decission;
        float buf[28];
        struct stat sbuf;
        float atof();
        double cos();

/*
 *      Process any argument flags
 */
        pname = *argv;
        minpow = savestart = length = 0;
        outfd = stdout;
        decission = 0.30;                 /*default is 30%*/
        if (argc < 8)
                usage();
        tol = atof(*++argv);
        argc--;
        while (--argc > 0) {
                switch((*++argv)[1]) {
                        case 't':
                                minpow = atof(*++argv);
                                argc--;
                                break;
                        case 's':
                                savestart = atoi(*++argv);
```

*main*

```
                    savestart *= sizeof(apbuf[0]);
                    argc--;
                    break;
            case 'l':
                    length = atoi(*++argv);
                    length *= sizeof(apbuf[0]);
                    argc--;
                    break;
            case 'n':
                    nostats = 1;
                    break;
            case 'p':
                    decission = atof(*++argv);
                    argc--;
                    break;
            case 'o':
                    outfile = *++argv;
                    argc--;
                    outfd = fopen(outfile,"w");
                    break;
            case 'm':
                    mfiles = argv;
                    while ((*++argv)[0] != '-' && --argc > 0)
                            nmodels++;
                    argv--;
                    break;
            case 'i':
                    ifiles = argv;
                    while ((*++argv)[0] != '-' && --argc > 0)
                            ninput++;
                    argv--;
                    break;
            default:
                    usage();
            }
    } if (!mfiles || !ifiles || !length)
            usage();
    if (outfd == NULL)
            exit(perror(outfile));

/*
 *  Make the window values
 */ for (i = 0; i < SIZE; i++)
            windval[i] = (1.0 - cos((PI2*i)/(SIZE-0)))/2.0;

/*
 *  Clear out the AP and stuff in any necessary constants
 */ apclr();
    zmd();
    apput(windval,0,SIZE,2);
    mtmov(0,WINDOW,SIZE);
    apput1(tol,0);
    mtmov(0,TOL,1);
    tol = 1e30;
    apput1(tol,0);
    mtmov(0,TOL+1,1);
    apput1(minpow,0);
    mtmov(0,MINPOW,1);
    apput1(MINHVAL, AHMIN);
    apput1(MAXHVAL, AHMAX);

/*
 *  Read in the load file of characters
 */
```

```
                j = ICHR - 1;
printf("%d models\n",nmodels);
        for (i = 0; i < nmodels; i++) {
                if ((infd = open(*++mfiles,0)) == -1)
                        exit(perror(*argv));
                rnorm(i, infd);              /*read the normalization stuff first*/
                if(!nostats)
                        normprint(i);
                ndata = 0;
                while (read(infd,buf,sizeof buf) == sizeof buf) {
                        apput(buf,j,NN,2);
                        j += NN;
                        ndata++;
                }
                close(infd);
                apput(&ndata,CHRNUM + i,1,1);
        }
/*
 *
 *      Process each input file
 *
 *      Note:   Setting i=1 on the outside of the loop over the input files
 *              causes each file to be treated as a continuation of the
 *              previous input file. Setting i=1 after each input file
 *              is opened causes the input files to be treated as individual
 *              files.
 */
        i = 1;
        while (ninput--) {
                start = savestart;
                if ((infd = open(*++ifiles,0)) == -1)
                        exit(perror(*ifiles));
                fprintf(outfd, "Processing %s\n",*ifiles);
                fstat(infd,&sbuf);
                bytesremaining = sbuf.st_size - start;
                nbytes = sbuf.st_size - start;
                /*loop for each length size segment*/
                while(bytesremaining > length){
                        nbytes = length;
                        lseek(infd,start,0);
                        ndata = nbytes < sizeof(apbuf) ? nbytes : sizeof(apbuf);
                        while (ndata > 0) {
                                read(infd,apbuf,ndata);
                                nbytes -= ndata;
                                ndata /= sizeof(apbuf[0]);
                                apput(apbuf,BUFA,ndata,1);
                                apmain(BUFA,ndata,i,nmodels);
                                if (nbytes <= 0)
                                        break;
                                ndata = nbytes < sizeof(apbuf) ? nbytes : sizeof(apbuf);
                                i = 0;
                        }
                        vfix(HBASE,1,HBASE,1,HSIZE * nmodels);
                        apget(hbuf,HBASE,HSIZE * nmodels,1);
                        vclr(HBASE,1,HSIZE*nmodels);
                        decode(hbuf,nmodels, decission, *ifiles);    /*output winner*/
                        bytesremaining -= length;
                        start += length;
                }
                close(infd);
        }
}
                                                                        apput1
apput1(value,addr)
  float value;
  unsigned short addr;
{
        apput(&value,addr,1,2);
}
```

```
decode(hbuf,numhist,decission, filename)                                    decode
        char *filename;
        short *hbuf, numhist;
        float decission;
{
        float gausian();
        float scores[MAXMODEL];
        int indexs[MAXMODEL];
        register int      i, model;
        short max;
        int       total,index,nbytes,nmodels;
        float distance,score;
        double spkprob, impprob, erfc();
        float smean, ssdv, imean, isdv,maxscore;

maxscore = 0;
        for (model = 0; model < numhist; model++) {
                total = sum(&hbuf[model * HSIZE]);
                index = findit(&hbuf[model * HSIZE], (int) (total * decission));
                distance = (index/128.0) * ( MAXHVAL - MINHVAL ) + MINHVAL ;

if(!nostats){
                        smean = stats[model][index_decission].spkmean;
                        imean = stats[model][index_decission].impmean;
                        ssdv = stats[model][index_decission].spksdv;
                        isdv = stats[model][index_decission].impsdv;
                        spkprob = gausian(distance, smean, ssdv);
                        impprob = gausian(distance, imean, isdv);
/*
                        spkprob = (distance - smean)/ssdv;
                        spkprob /= 1.4142135;
                        spkprob = erfc(spkprob);
                        impprob = (imean - distance)/isdv;
                        impprob /= 1.4142135;
                        impprob = erfc(impprob);
*/
                        score = spkprob/ (impprob + spkprob);
                } if (nostats)
                        fprintf(outfd, "%6.3f ",distance);
                scores[model] = score;
                indexs[model] = index;
                if(score > maxscore){
                        maxscore = score;
                        max = model;
                }
        }
        if (nostats)
                fprintf(outfd, "\n");
        else{
                fprintf(outfd, "SCORES:    (%s) winner = %2d (%5.3f)\n", filename,max+1, maxsp
                for(i=0; i< numhist; i++)
                                                                        ...decode fprintf(outfd,"%5.3f ",scores[i]);
                fprintf(outfd,"\n");
                for(i=0; i< numhist; i++)
                        fprintf(outfd,"%5d ",indexs[i]);
                fprintf(outfd,"\n");
                fflush(stdout);
        }
} float                                                                      gausian
gausian(x, mean, sdv)
float x, mean, sdv;
{
        float sqrt2pim1 = .3989;
        double exp();
```

```
        float tmp;
        tmp = (x-mean)/sdv;
        tmp *= tmp;
        return( sqrt2pim1 * exp( -0.5* tmp) );
}
``` sum

```
sum(ptr)
 short *ptr;
{
        register int    i,sum;

for (sum = i = 0; i < HSIZE; i++)
                sum += *ptr++;
        return(sum);
}
``` findit

```
findit(ptr, num)
 short *ptr;
 int    num;
{
        register int    i,sum;

for (sum = i = 0; i < HSIZE; sum += *ptr++, i++)
                if (sum > num)
                        return(i);
        return(i);
}
``` rnorm

```
rnorm(modelnum, fd)
short modelnum;
int fd;
{
        int size,i;
        if(nostats)
                return;

/*      First read the number of percentage values contained in the model */
printf("calling rnorm %d, %d\n",modelnum,fd);
        size = read(fd, &numpercents, sizeof numpercents);
        if(size != sizeof numpercents)
                exit(printf("numpercents read error\n"));
        if(numpercents > MAXPERCENTS)
                exit(printf("Too many entries in model stats (%d)\n",numpercents));
        if(index_decission > numpercents-1)
                index_decission = numpercents -1;

for(i = 0; i < numpercents; i++){
                size = read(fd, &stats[modelnum][i], sizeof stats[0][0]);
                if(size != sizeof stats[0][0])
```

...rnorm

```
                        exit(printf("stats read error model %d\n",modelnum));
        }
}
``` normprint

```
normprint(model)
int model;
{
        int per;
        for(per=0; per< numpercents; per++)
                printf("spk=%d per=%d sm=%f im=%f sv=%f iv=%f per=%d\n",
                model, per, stats[model][per].spkmean, stats[model][per].impmean,
                stats[model][per].spksdv, stats[model][per].impsdv,
                stats[model][per].percentvalue);
}
``` usage

```
usage()
{
        exit(printf(
        "Usage: %s threshold [-t minpow] [-p decission-thres] [-s start] -l length [-o outputfile]\n",
                                pname));
}
```

```

#include         "lpc.h"
                                                                apmain
apmain(read,size,firstime,nchr)
  int     read,size,firstime,nchr;
{
        int     i,j,last;
        int     n,num;
        int     rchr,bchr;

loop:   vflt(read,1,INBUF,1,size);
        i = size;
lp:     i = i - FSKIP;
        if (i >= FSKIP)
                goto lp;
        if (i == 0)
                goto cont;
        i = FSKIP - i;
        j = INBUF + size;
        vclr(j,1,i);
        size = size + i;
cont:   last = INBUF + size;
        last = last - SIZE;
        i = INBUF + FSKIP;
        if (firstime == 1)
                goto doit;
        i = START;
doit:   mkchar(i);
        j = *APTR;
        if (j == -1)
                goto skip;
        j = 0;
        num = CHRNUM;
        bchr = BCHR;
        rchr = RCHR;
mclp:   n = *num;
        minchr(RPTR,APTR,rchr,bchr,NAR,NN,n,J1);
        n = n * NN;
        bchr = bchr + n;
        rchr = rchr + n;
        n = j * HSIZE;
        n = n + HBASE;
        hist(J1,1,n,1,HSIZE,AHMAX,AHMIN);
        num = num + 1;
        j = j + 1;
        if (j < nchr)
                goto mclp;
skip:   i = i + FSKIP;
        if (i < last)
                goto doit;
        vmov(last,1,START,1,SIZE);
} include         <lpc.h>

$title   mkchar
        $entry   mkchar,1.
        $ext     div
        $ext     lpauto
        $ext     atob
        input    $equ    0.     "address of the input time series
        rptr     $equ    0.     "pointer to the r's of the time series
        aptr     $equ    1.     "pointer to the a's of the time series
        bptr     $equ    1.     "pointer to the b's of the time series
        wptr     $equ    1.     "FFT window function pointer (TM)
        nar      $equ    2.     "number of a's or r's
        rchr     $equ    2.     "pointer to the r's of the characters
        bchr     $equ    3.     "pointer to the b's of the characters
        nbr      $equ    4.     "number of b's or r's
        n        $equ    5.     "used variously
        nc       $equ    6.     "number of characters
```

```
           anc     $equ    7.      "address of the number of characters
           lpc     $equ    7.      "pointer to lpcbuf
           rout    $equ    7.      "where to output the ts r's
           ichr    $equ    8.      "pointer to the hit count of the chars
           nn      $equ    9.      "size of a character
mkchar:    ldspi n; db=SIZE.       "initialize pointers
           ldspi wptr; db=WINDOW.
           ldspi lpc; db=LPCBUF.
           mov input,input; setma  "fetch time series points
           mov wptr,wptr; settma; incma   "fetch window points
           lddpa; db=4.
           dpx<md
           inc input; setma;
                   fsub dpx,md     "d(0) = ts(0) — ts(1)
           inc wptr; settma; incma;
                   fadd dec lpc;
                   fmul tm,fa      "w(0) * d(0)
           dpx<md
loop:      inc input; setma;
                   fsub dpx,md     "d(i) = ts(i) — ts(i+1)
           inc wptr; settma; incma;
                   fadd;
                   fmul
           dec n;
                   fmul tm,fa      "w(i) * d(i)
           inc lpc; setma; mi<fm;
                   dpx<md;
                   bne loop        "done all time series points ???
           ldspi 0.; db=SIZE.      "load up paramters for lpauto...
           ldspi 1.; db=LPCBUF.
           ldspi 2.; db=NAR.—1
           ldspi 3.; db=J1.
           ldspi 4.; db=NAR.
           ldspi 5.; db=APTR.
           ldspi 6.; db=J2.
           ldspi 7.; db=RPTR.
           ldspi 8.; db=J3.
           jsr lpauto              "lpauto generates the a's and r's
           ldtma; db=MINPOW.
           ldspi rptr; ldma; db=RPTR.   "Scale the r's by r(0)
           mov rptr,rout; ldtma; db=!one
           dpy(-4)<tm
           inc rptr; setma;
                   fsub dpy(-4),md;
                   dpx<md
           fadd;
                   dpx(-1)<tm;
                   dpy<tm
           ldspi n; db=NAR.—1
           bfit more
           clr n
           dec n; dpx<spfn`
           ldspi n; db=APTR.
           mov n,n; setma; mi<dpx
           return
more:          jsr div             "get 1 / r(0)                more
           inc rptr; setma;
                   fmul dpx,md     "r(1) / r(0)
           mov rout,rout; setma; mi<dpx(-1);
                   fmul
lp:        inc rptr; setma
           dec n;
                   fmul dpx,md     "r(i) / r(0)
           inc rout; setma; mi<fm;
                   fmul;
                   bne lp
           ldspi rptr; db=RPTR.    "Convert the a's to b's
           ldspi aptr; db=APTR.
           ldspi nar; db=NAR.
           jsr atob
```

```
          nop
          return
          $end
```
minchr.aps minchr.aps

*...more*

```

#include         <lpc.h>

$title     minchr
          $entry     minchr,8.
          $ext       itak
          rptr       $equ     0.        "pointer to the r's of the time series
          bptr       $equ     1.        "pointer to the b's of the time series
          rchr       $equ     2.        "pointer to the r's of the characters
          bchr       $equ     3.        "pointer to the b's of the characters
          nbr        $equ     4.        "number of b's or r's
          nn         $equ     5.        "size of a character
          nc         $equ     6.        "number of characters
          out        $equ     7.        "where to output min dist
minchr:   ldtma; db=TOL.                "Get the tolerances
          inctma
          dpy(-4)<tm
          dpy(-3)<tm
again:    jsr itak                      "YES, start checking...
          add nn,rchr;
                    fsubr dpx,dpy(-4)   "tol(0) - itak dist
          add nn,bchr;
                    fsubr dpx,dpy(-3)   "tol(1) - itak dist
          fadd
          ldtma; db=!one;
                    bfge inchar         "itak dist < tol(0) ???
          dec nc;
                    bfge nchar          "itak dist < tol(1) ???
ent:      bne again                     "More characters ???
          dpx<dpy(-3);
                    br inchar
nchar:    mov nc,nc;
                    dpy(-3)<dpx;
                    br ent
inchar:   mov out,out; setma; mi<dpx
          return
          $end
          $title     atob
"
"This routine will convert an input frame to an output frame in
"the following format:
"
"         input frame                          output frame
"         ————————————— top of frame           —————————————
"         target word                          target word
"         context word                         context word
"         r[0]                                 (a dot a) / (a dot r)
"         r[1]                                 r[1]
"            .                                    .
"            .                                    .
"            .                                    .
"         r[nar - 1]                           r[nar - 1]
"         a[0]                                 0 or -1 (see below)
"         a[1]                                 b[1]
"            .                                    .
"            .                                    .
"            .                                    .
"         a[nar - 1]                           b[nar - 1]
"         —————————————bottom of frame         —————————————
```

"and compute (a dot a) / (a dot r) and store the rusult in r[0] and then
"convert the a array into a b array, and when either the target word or
"the context word changes from one frame to the next stores a -1 in b[0],
"otherwise a zero is stored in b[0]. It also counts the number of
"different target words encounterd and sources the result in the memory
"address given by the parameter out.

```
"The algorithm used to convert the a's to b's is:
"
"       b[i] = (1/[2(a dot a)]) SUM (from j = i to nar) &a[j] dot a
"
"where &a[j] indicates an array starting at the address of a[j] of
"(nar-j) in length.
"
            $entry   atob,3.
            $ext     dot
            $ext     div
            p0       $equ     0.              "rptr
            p1       $equ     1.              "aptr
            p2       $equ     2.              "nar
            nar      $equ     9.              "p2 goes here
            rptr     $equ     10.             "points to the r's
            aptr     $equ     11.             "points to the a's
            n        $equ     12.             "number of anythings
atob:       mov p0,rptr
            mov p1,aptr
            mov p2,nar
            jsr dot                           "do a dot r
            dpy<tm;                           "put 1 here
                     jsr div                  "do 1 / (a dot r)
            mov aptr,p0;
                     dpy(-1)<dpx              "save 1 / (a dot r) here
            jsr dot                           "do a dot a
            mov nar,n;
                     dpx(-1)<dpx              "save a dot a here
            dpy<tm;                           "put 1 here
                     jsr div                  "do 1 / (a dot a)
            dec n;
                     fmul dpy(-1),dpx(-1)     "(a dot a) / (a dot r)
            dec n;
                     fadd dpx,dpx;            "2 / (a dot a)
                     fmul
            dec p2;
                     fadd;
                     fmul
            mov rptr,rptr; setma; mi<fm;      "save (a dot a) / (a dot r) here
                     dpy<fa
            inc p1
loop:       dpx(-1)<fm;                       "save result here
                     jsr dot                  "do (a[i] dot a[0])
            inc p1;
                     fmul dpx,dpy
            dec p2;
                     fmul;
                     dpy(1)<dpy               "copy initial factor
            mov aptr,rptr; incdpa;
                     fmul;
                     bgt loop
            add# nar,aptr; setma;
                     dpx(-1)<fm
            mov n,n
lp:         dec n; decdpa; decma; mi<dpx(-1); "write out b's
                     bgt lp
            return
            $end
            $title   itak
"
"Usage:      itak(ru, bu, rt, bt, n);
"
"where:      ru      is a pointer to the r's of the utterance
"            bu      is a pointer to the b's of the utterance
"            rt      is a pointer to the r's of the template
"            bt      is a pointer to the b's of the template
"            n       is the number of a's or b's
"
"
```

```
"This routine computes a SINGLE itakura distance between an utterance
"and a template frame with r's and b's pointed at by the input paramters.
"This distance is left in dpx and fm. It is assumed that ru[0] and rt[0]
"contain the (a dot a)/(a dot r) scaling factors. The first location of
"the r's and the b's are not used, but rather are assumed to be 1.0 in the
"dot products shown below.
"
"Algorithm:
"          distance = 5 log { ru[0] * rt[0] * (ru dot bt) * (rt dot bu) }
"
"This routine uses:
"          sp(12. - 15.)
"          dpx(-1 to +1) relative to dpa
"          dpy(-2 to +1) relative to dpa
"          fa, fm, ma, tma
"it does not alter the value of the argument paramters.
"
          $entry    itak,5.
          $ext      log
          $ext      dot
          p0        $equ    0.              "ru (r's of the utterance)
          p1        $equ    1.              "bu (b's of the utterance)
          p2        $equ    2.              "rt (r's of the template)
          bt        $equ    3.              "bt (b's of the template)
          n         $equ    4.              "number of r's or b's
          save      $equ    12.
          rt        $equ    13.
itak:     mov p0,save; setma                "fetch (a dot a)/(a dot r) of utt.
          inc save
          mov p2,p0; setma                  "fetch (a dot a)/(a dot r) of template
          inc p0;
              dpx(-1)<md
          inc p1; ldtma; db=!five
          inc p2;                           "bump the pointers around...
              dpy(-1)<md
          inc bt                            "...what a waste...
          mov p2,rt;
              dpy(-2)<tm
          mov n,p2
          dec p2
          jsr dot                           "do rt dot bu
          mov save,p0;
              fmul dpx(-1),dpy(-1)          "[(a dot a)/(a dot r)](u) X (r)
          mov p1,save;
              fadd tm,dpx;                  "add one onto dot product
              fmul
          mov bt,p1;
              fadd;
              fmul
          dpx(-1)<fa;
              dpy(-1)<fm;
              jsr dot                       "do ru dot bt
          mov save,p1;
              fmul dpx(-1),dpy(-1)          "multiply all the factor together
``` itak.aps                                                                  itak.aps ...more

```
          mov rt,p2;
              fadd,tm,dpx;                  "add one onto dot product
              fmul
          dec p0;
              fadd;
              fmul
          dec p1;
              fmul fm,fa
          dec p2;
              fmul
          dec bt;
              fmul
```

```
            dpx<fm;
                    jsr log              "take the log of all of it
            fmul dpy(-2),dpx             "multiply by five
            fmul
            fmul
            dpx<fm;
                    return
            $end
``` dot.aps dot.aps

...more

```
            $title   dot
"
"Usage:             dot(a,b,n)
"
"where:      a      is the base address of the first array
"            b      is the base address of the second array
"            n      is the number of elements
"
"This routine computes the vector dot product of the two input vectors
"a and b (each of length n) and leaves the result in fa and dpx.
"
"This routine uses:
"           sp(14.) and sp(15.)
"           dpx(0) relative to dpa
"           fa, fm, tma, ma
"the input s pad paramers a, b, and n are not changed.
"In addition, 1.0 is left in the table memory read regiseter.
"
            $entry   dot,3.
            a        $equ     0.
            b        $equ     1.
            n        $equ     2.
            ta       $equ     14.
            tb       $equ     15.
dot:        ldspi ta; db=27.
            ldtma; db=!one
            mov n,n; dpx<spfn
            mov ta,ta;
                    fadd zero,mdpx
            mov a,ta; setma;
                    fadd
            mov b,tb; setma
            inc ta; setma;
                    fadd zero,fa
            inc tb; setma;
                    fadd;
                    dpx<md
            inc ta; setma;
                    fsubr tm,fa;
                    fmul dpx,md
            inc tb; setma;
                    fadd zero,zero;
                    fmul;
                    dpx<md; bfgt loop
            dpx<zero;
                    return
loop:       inc ta; setma;
                    fsubr tm,fa;
                    fmul dpx,md
            inc tb; setma;
                    fadd fm,fa;
                    fmul;
                    dpx<md; bfgt loop
            fadd
            dpx<fa;
                    return
            $end
```

Makefile

```
SOURCES = lpc.h hist.c
APSOURCES = apmain.v match.aps atob.aps itak.aps dot.aps
OBJECTS = hist.o apmain.o
LIBES =    -lV -lm
CFLAGS = -L -O histstats:              $(OBJECTS)
            cc $(OBJECTS) $(LIBES) -o histstats hist.o:     hist.c lpc.h apmain.o:   apmain.apb match.apb atob.apb itak.apb dot.apb
            apal apmain.apb match.apb atob.apb itak.apb dot.apb -lV apmain.apb: apmain.v lpc.h
            cap -I. apmain.v match.apb:  match.aps lpc.h
            apsify -I. match.aps itak.apb:   itak.aps
            apal -c itak.aps dot.apb:    dot.aps
            apal -c dot.aps atob.apb:   atob.aps
            apal -c atob.aps listing:
            vgrind Makefile $(SOURCES) $(APSOURCES) &
``` lpc.h

```

/*
 *      Main Data Memory Addresses
 */
#define OUTCNT      99
#define LPCBUF      100
#define ANC         300
#define RPTR        301
#define APTR        314
#define J1          327
#define J2          340
#define J3          353
#define BUFA        400
#define START       4800
#define INBUF       5000
#define ICHR        9501
#define RCHR        9502
#define BCHR        9515

/*
 *      Table Mememory Addresses
 */
#define MINPOW      4096
#define TOL         4097
#define WINDOW      4100

/*
 *      Numbers of things
 */
#define SIZE        200
#define NAR         13
```

```
#define NN            28
#define FSKIP         100
#define BUFSIZE       4400
#define MAXCHARS      2000
#define MAXSEGMENTS   10
``` hist.c

...histstats

```
/*      This was called ~phb/lpmnobuf/aplpm.c but was really charhist.c*/

/*      This is now the routine to generate the histograms of each
 *      segment of l samples for an input file
 *              Writes out a structure of the form stats with sum x
 *                      and sum x*x plus numsegemts and numchars
 *      Called once for each speaker to be modeled.
 *                      ie.
 *      #
 *      if ($#argv < 1) then
 *              echo "Usage histrun input files"
 *              exit
 *      endif
 *
 *      foreach file ($*)
 *              set a = $file:t
 *              set a = $a.r
 *              set b = $a:e
 *              echo $a $b
 *              ../histstats -t 1000 -l 80000 1.5 kp.$b char.1_11.s $file>>LOG
 *      end
 */

#include        <sys/types.h>
#include        <sys/stat.h>
include        <stdio.h> include        "lpc.h"

define PI2     (2*3.14159265)

struct{
        short numchars;
        short numsegments;
        long sumx[MAXCHARS];
        long sumxx[MAXCHARS];
}       stats;

short apbuf[BUFSIZE];
float fbuff[MAXCHARS];
long hist[MAXSEGMENTS][MAXCHARS];

main(argc, argv)
        int argc;
        char **argv;
{
        int i, j, infd, outfd;
        int start,length,nbytes;
        int junk,ndata;
        char *pname;
        float windval[SIZE],x,tol,minpow;
        float buf[28];
        struct stat sbuf;
        float atof();
        double cos();
        float *fpnt;
        long *lpnt;
        short loops, loop;
        long segment, chars;
        long sumx, sumxx, xval;
```

*main* hist.c hist.c

...main

```
/*
 *
 */
        Process any argument flags pname = *argv;
        minpow = start = length = 0;
        while ((*++argv)[0] == '-') {
                argc -= 2;
                switch((*argv)[1]) {
                case 't':
                                minpow = atof(*++argv);
                                break;
                case 's':
                                start = atoi(*++argv);
                                start *= sizeof(apbuf[0]);
                                break;
                case 'l':
                                length = atoi(*++argv);
                                length *= sizeof(apbuf[0]);
                                break;
                default:
                                exit(printf(
                                        "Usage: %s [-t minpow] [-s start] -l length threshold
                                        pname));
                }
        }
        if (argc < 5)
                exit(printf("Usage: %s [-t minpow] [-s start] -l length threshold outputfile loadf /*
 *
 */
        Get the tolerance value and open the output file tol = atof(*argv) * 0.75;
        outfd = creat(*++argv,0666);
        if (outfd < 0)
                exit(perror(*argv));

/*
 *
 */
        Make the window values for (i = 0; i < SIZE; i++)
                windval[i] = (1.0 - cos((PI2*i)/(SIZE-0)))/2.0;

/*
 *
 */
        Clear out the AP and stuff in any necessary constants apclr();
        zmd();
        apput(windval,0,SIZE,2);
        mtmov(0,WINDOW,SIZE);
        apput(&tol,0,1,2);
        mtmov(0,TOL,1);
        tol = 1e30;
        apput(&tol,0,1,2);
        mtmov(0,TOL+1,1);
        apput(&minpow,0,1,2);
        mtmov(0,MINPOW,1);

/*
 *
 */
        Read in the load file of characters if ((infd = open(*++argv,0)) == -1)
                exit(perror(*argv));
        i = 0;
        j = ICHR - 1;
```

```
while (read(infd,buf,sizeof buf) == sizeof buf) {
        apput(buf,j,NN,2);
        j += NN;
        i++;
}
close(infd);
apput(&i,ANC,1,1);
vclr(ICHR,NN,i);
```

/*
 * Process THE input file (only one!!)
 *
 * Note:    Setting i=1 on the outside of the loop over the input files
 *          causes each file to be treated as a continuation of the
 *          previous input file. Settine i=1 after each input file
 *          is opened causes the input files to be treated as individual
 *          files.
 */

```
i = 1;
argc -= 4;
if(argc !=1)
        exit(printf("hist.c: Wrong arg count %d\n",argc));
if ((infd = open(*++argv,0)) == -1)
        exit(perror(*argv));
fstat(infd,&sbuf);
nbytes = sbuf.st_size - start;
lseek(infd,start,0);
loops = nbytes/length;
if(loops ==0)
        exit(printf("hist.c: Only %d samples in file %s\n",nbytes/2, argv));
if(loops > MAXSEGMENTS)
        loops = MAXSEGMENTS;

for(loop = 0; loop < loops; loop++){
printf("hist.c: loop = %d out of %d\n",loop,loops);
        i=0;
        nbytes = length;
        ndata = nbytes < sizeof(apbuf) ? nbytes : sizeof(apbuf);
        while (ndata > 0) {
                read(infd,apbuf,ndata);
                nbytes -= ndata;
                ndata /= sizeof(apbuf[0]);
                apput(apbuf,BUFA,ndata,1);
                apmain(BUFA,ndata,i);
                if (nbytes <= 0)
                        break;
                ndata = nbytes < sizeof(apbuf) ? nbytes : sizeof(apbuf);
                i = 0;
        }
```

/*
 * Get the total number of characters used, and then read, store,
 * and zero the occurance counts
 */

```
        apget(&i,ANC,1,1);
        if (i >= MAXCHARS)
                printf("hist.c: WARNING: Character Table Overflow\n");
        j = ICHR;
        vmov(j,NN,INBUF,1,i);
        vclr(j, NN,i);              /*clear the occurance counts*/
        apget(fbuff,INBUF,i,2);
        fpnt = (float*)fbuff;       /*convert floats to longs */
        for(j=0; j< i; j++){
                hist[loop][j] = *fpnt++;
        }
```

...main

```
                normalizesegment(i,loop);        /*pass the number of character and segment#*/
        }
printf("hist.c: Writing stuff out\n");
        close(infd);
        stats.numchars = i;
        stats.numsegments = loops;
        for(chars = 0; chars < stats.numchars; chars++){
                sumx = sumxx = 0;
                for(segment = 0; segment < stats.numsegments; segment++){
                        xval = hist[segment][chars];
/*printf("%7d",xval);*/
                        sumx += xval;
                        sumxx += xval*xval;
                }
/*printf("\n");*/
                stats.sumx[chars] = sumx;
                stats.sumxx[chars] = sumxx;
        }
        if(write(outfd,&stats, sizeof stats) != sizeof stats)
                exit(perror("output file"));

}
```

*normalizesegment*

```
normalizesegment(numchars, segmentnum)
        int numchars, segmentnum;
{
        int chars, segment, totalchars;
                totalchars = 0;
                for(chars= 0; chars < numchars; chars++)
                        totalchars += hist[segmentnum][chars];
                for(chars = 0; chars < numchars; chars++){
                        hist[segmentnum][chars] *= 10000;
                        hist[segmentnum][chars] /= totalchars;
                }
}
``` apmain.v                                                                apmain.v

```

#include        <lpc.h>
```

*apmain*

```
apmain(read,size,firstime)
        int     read,size,firstime;
{
        int     i,j,last;

loop:   vflt(read,1,INBUF,1,size);
        i = size;
lp:     i = i - FSKIP;
        if (i >= FSKIP)
                goto lp;
        if (i == 0)
                goto cont;
        i = FSKIP - i;
        j = INBUF + size;
        vclr(j,1,i);
        size = size + i;
cont:   last = INBUF + size;
        last = last - SIZE;
        i = INBUF + FSKIP;
        if (firstime == 1)
                goto doit;
        i = START;
doit:   mkchar(i);
        i = i + FSKIP;
        if (i < last)
                goto doit;
        vmov(last,1,START,1,SIZE);
}
``` match.aps

```

#include        <lpc.h>

$title   mkchar
        $entry   mkchar,1.
        $ext     div
        $ext     lpauto
        $ext     atob,itak
        input    $equ    0.      "address of the input time series
        rptr     $equ    0.      "pointer to the r's of the time series
        aptr     $equ    1.      "pointer to the a's of the time series
        bptr     $equ    1.      "pointer to the b's of the time series
        wptr     $equ    1.      "FFT window function pointer (TM)
        nar      $equ    2.      "number of a's or r's
        rchr     $equ    2.      "pointer to the r's of the characters
        bchr     $equ    3.      "pointer to the b's of the characters
        nbr      $equ    4.      "number of b's or r's
        n        $equ    5.      "used variously
        nc       $equ    6.      "number of characters
        anc      $equ    7.      "address of the number of characters
        lpc      $equ    7.      "pointer to lpcbuf
        rout     $equ    7.      "where to output the ts r's
        ichr     $equ    8.      "pointer to the hit count of the chars
        nn       $equ    9.      "size of a character
mkchar: ldspi n; db=SIZE.        "initialize pointers
        ldspi wptr; db=WINDOW.
        ldspi lpc; db=LPCBUF.
        mov input,input; setma           "fetch time series points
        mov wptr,wptr; settma; incma     "fetch window points
        lddpa; db=4.
        dpx<md
        inc input; setma;
                fsub dpx,md              "d(0) = ts(0) - ts(1)
        inc wptr; settma; incma;
                fadd dec lpc;
                fmul tm,fa               "w(0) * d(0)
        dpx<md
loop:   inc input; setma;
                fsub dpx,md              "d(i) = ts(i) - ts(i+1)
        inc wptr; settma; incma;
                fadd;
                fmul
        dec n;
                fmul tm,fa               "w(i) * d(i)
        inc lpc; setma; mi<fm;
                dpx<md;
                bne loop                 "done all time series points ???
        ldspi 0.; db=SIZE.               "load up paramters for lpauto...
        ldspi 1.; db=LPCBUF.
        ldspi 2.; db=NAR.-1
        ldspi 3.; db=J1.
        ldspi 4.; db=NAR.
        ldspi 5.; db=APTR.
        ldspi 6.; db=J2.
        ldspi 7.; db=RPTR.
        ldspi 8.; db=J3.
        jsr lpauto                       "lpauto generates the a's and r's
        ldtma; db=MINPOW.
        ldspi rptr; ldma; db=RPTR.
        mov rptr,rout; ldtma; db=!one    "Scale the r's by r(0)
        dpy(-4)<tm
        inc rptr; setma;
``` match.aps

```
                    fsub dpy(-4),md;
                    dpx<md
        fadd;
                    dpx(-1)<tm;
                    dpy<tm
        ldspi n; db=NAR.-1
        bflt .+2
        return
        jsr div                              "get 1 / r(0)
        inc rptr; setma;
                    fmul dpx,md              "r(1) / r(0)
        mov rout,rout; setma; mi<dpx(-1);
                    fmul
lp:     inc rptr; setma
        dec n;
                    fmul dpx,md              "r(i) / r(0)
        inc rout; setma; mi<fm;
                    fmul;
        bne lp
        ldspi rptr; db=RPTR.                 "Convert the a's to b's
        ldspi aptr; db=APTR.
        ldspi nar; db=NAR.
        jsr atob
        ldtma; db=TOL.                       "Get the tolerances
        ldspi anc; ldma; db=ANC.             "initialize all the pointers...
        ldspi rptr; db=RPTR.
        clr anc; inctma;
                    dpy(-4)<tm
        ldspi bptr; db=APTR.
        ldspi nc; db=md
        ldspi nbr; db=NAR.
        ldspi ichr; db=ICHR.
        ldspi rchr; db=RCHR.
        ldspi bchr; db=BCHR.
        mov nc,n;
                    dpy(-3)<tm
        ldspi nn; db=NN.
again:  jsr itak                             "YES, start checking...
        add nn,rchr;
                    fsubr dpx,dpy(-4)        "tol(0) - itak dist
        add nn,bchr;
                    fsubr dpx,dpy(-3)        "tol(1) - itak dist
        fadd
        ldtma; db=!one;
                    bfge inchar              "itak dist < tol(0) ???
        dec n;
                    bfge spos                "itak dist < tol(1) ???
ent:    add nn,ichr;
                    bne again                "More characters ???
        mov anc,ichr
inchar: mov ichr,ichr; setma                 "Here we increment the char hit count
        spmda;
                    fadd tm,md               "bump it
        fadd
        mov ichr,ichr; setma; mi<fa;         "write it out
                    return
spos:   mov ichr,anc;
                    dpy(-3)<dpx
        mov n,n;
                    br ent
        $end
``` atob.aps

```
            $title   atob
"
"This routine will convert an input frame to an output frame in
"the following format:
"           input frame                          output frame
"           ———————————— top of frame            ————————————
"           target word                          target word
"           context word                         context word
"           r[0]                                 (a dot a) / (a dot r)
"           r[1]                                 r[1]
"             .                                    .
"             .                                    .
"             .                                    .
"           r[nar − 1]                           r[nar − 1]
"           a[0]                                 0 or −1 (see below)
"           a[1]                                 b[1]
"             .                                    .
"             .                                    .
"             .                                    .
"           a[nar − 1]                           b[nar − 1]
"           ——————————— bottom of frame          ————————————
"
"and compute (a dot a) / (a dot r) and store the rusult in r[0] and then
"convert the a array into a b array, and when either the target word or
"the context word changes from one frame to the next stores a −1 in b[0],
"otherwise a zero is stored in b[0]. It also counts the number of
"different target words encounterd and sources the result in the memory
"address given by the parameter out.
"
"The algorithm used to convert the a's to b's is:
"
"       b[i] = (1/[2(a dot a)]) SUM (from j = i to nar) &a[j] dot a
"
"where &a[j] indicates an array starting at the address of a[j] of
"(nar−j) in length.
"
            $entry   atob,3.
            $ext     dot
            $ext     div
            p0       $equ     0.                  "rptr
            p1       $equ     1.                  "aptr
            p2       $equ     2.                  "nar
            nar      $equ     9.                  "p2 goes here
            rptr     $equ     10.                 "points to the r's
            aptr     $equ     11.                 "points to the a's
            n        $equ     12.                 "number of anythings
atob:       mov p0,rptr
            mov p1,aptr
            mov p2,nar
            jsr dot                               "do a dot r
            dpy<tm;                               "put 1 here
                jsr div                           "do 1 / (a dot r)
            mov aptr,p0;
                dpy(−1)<dpx                       "save 1 / (a dot r) here
            jsr dot                               "do a dot a
            mov nar,n;
                dpx(−1)<dpx                       "save a dot a here
            dpy<tm;                               "put 1 here
                jsr div                           "do 1 / (a dot a)
            dec n;
                fmul dpy(−1),dpx(−1)              "(a dot a) / (a dot r)
            dec n;
                fadd dpx,dpx;                     "2 / (a dot a)
                fmul
```

```
                dec p2;
                    fadd;
                    fmul
                mov rptr,rptr; setma; mi<fm;        "save (a dot a) / (a dot r) here
                    dpy<fa
                inc p1
loop:           dpx(-1)<fm;                         "save result here
                    jsr dot                         "do (a[i] dot a[0])
                inc p1;
                    fmul dpx,dpy
                dec p2;
                    fmul;
                    dpy(1)<dpy                      "copy initial factor
                mov aptr,rptr; incdpa;
                    fmul;
                    bgt loop
                add# nar,aptr; setma;
                    dpx(-1)<fm
                mov n,n
lp:             dec n; decdpa; decma; mi<dpx(-1); "write out b's
                    bgt lp
                return
                $end
``` itak.aps                                                                    itak.aps

```
                $title      itak
"
"Usage:          itak(ru, bu, rt, bt, n);
"
"where:          ru      is a pointer to the r's of the utterance
"                bu      is a pointer to the b's of the utterance
"                rt      is a pointer to the r's of the template
"                bt      is a pointer to the b's of the template
"                n       is the number of a's or b's
"
"This routine computes a SINGLE itakura distance between an utterance
"and a template frame with r's and b's pointed at by the input paramters.
"This distance is left in dpx and fm. It is assumed that ru[0] and rt[0]
"contain the (a dot a)/(a dot r) scaling factors. The first location of
"the r's and the b's are not used, but rather are assumed to be 1.0 in the
"dot products shown below.
"
"Algorithm:
"
                distance = 5 log { ru[0] * rt[0] * (ru dot bt) * (rt dot bu) }
"
"This routine uses:
"       sp(12. - 15.)
"       dpx(-1 to +1) relative to dpa
"       dpy(-2 to +1) relative to dpa
"       fa, fm, ma, tma
"it does not alter the value of the argument paramters.
"
                $entry      itak,5.
                $ext        log
                $ext        dot
                p0      $equ    0.              "ru (r's of the utterance)
                p1      $equ    1.              "bu (b's of the utterance)
                p2      $equ    2.              "rt (r's of the template)
                bt      $equ    3.              "bt (b's of the template)
                n       $equ    4.              "number of r's or b's
                save    $equ    12.
                rt      $equ    13.
itak:           mov p0,save; setma              "fetch (a dot a)/(a dot r) of utt.
                inc save
                mov p2,p0; setma                "fetch (a dot a)/(a dot r) of template
                inc p0;
```

```
                dpx(-1)<md
    inc p1; ldtma; db=!five
    inc p2;                                 "bump the pointers around...
                dpy(-1)<md
    inc bt                                  "...what a waste...
    mov p2,rt;
                dpy(-2)<tm
    mov n,p2
    dec p2
    jsr dot                                 "do rt dot bu
    mov save,p0;
                fmul dpx(-1),dpy(-1)        "[(a dot a)/(a dot r)](u) X (r)
    mov p1,save;
                fadd tm,dpx;                "add one onto dot product
                fmul
    mov bt,p1;
                fadd;
                fmul
    dpx(-1)<fa;
                dpy(-1)<fm;
                jsr dot                     "do ru dot bt
    mov save,p1;
                fmul dpx(-1),dpy(-1)        "multiply all the factor together
    mov rt,p2;
                fadd tm,dpx;                "add one onto dot product
                fmul
    dec p0;
                fadd;
                fmul
    dec p1;
                fmul fm,fa
    dec p2;
                fmul
    dec bt;
                fmul
    dpx<fm;
                jsr log                     "take the log of all of it
    fmul dpy(-2),dpx                        "multiply by five
    fmul
    fmul
    dpx<fm;
                return
    $end $title      dot
"
"Usage:          dot(a,b,n)
"
"where:      a       is the base address of the first array
"           b       is the base address of the second array
"           n       is the number of elements
"
"This routine computes the vector dot product of the two input vectors
"a and b (each of length n) and leaves the result in fa and dpx.
"
"This routine uses:
"       sp(14.) and sp(15.)
"       dpx(0) relative to dpa
"       fa, fm, tma, ma
"the input s pad paramers a, b, and n are not changed.
"In addition, 1.0 is left in the table memory read regiseter.
"
            $entry     dot,3.
            a          $equ     0.
            b          $equ     1.
            n          $equ     2.
            ta         $equ     14.
            tb         $equ     15.
dot:        ldspi ta; db=27.
            ldtma; db=!one
            mov n,n; dpx<spfn
            mov ta,ta;
```

```
                fadd zero,mdpx
        mov a,ta; setma;
                fadd
        mov b,tb; setma
        inc ta; setma;
                fadd zero,fa
        inc tb; setma;
                fadd;
                dpx<md
        inc ta; setma;
                fsubr tm,fa;
                fmul dpx,md
        inc tb; setma;
                fadd zero,zero;
                fmul;
                dpx<md; bfgt loop
        dpx<zero;
                return
loop:   inc ta; setma;
                fsubr tm,fa;
                fmul dpx,md
        inc tb; setma;
                fadd fm,fa;
                fmul;
                dpx<md; bfgt loop
        fadd
        dpx<fa;
                return
        $end
``` model.c model.c

```
/*      model.c
 *              generate short utterance algorithm models
 *              Reads the stat files for each of the talkers to be modeled.
 *              Generates the speaker and imposter means and variances
 *              and outputs the 40 characters to be used to model each
 *              talker.
 *
 *              The normalization data for the model is added by another program.
 *              EHW             4-30-82
 */
/*#include "lpc.h"*/
#define MAXMODELS       20
#define MAXCHARS        2000
int numsamples[MAXMODELS];
double sqrt();

struct fvalue{
                short charnum;
                float factor;
};

struct{
        short numchars;
        short numsegments;
        long sumx[MAXCHARS];
        long sumxx[MAXCHARS];
}       stats;

struct{
        float   smean[MAXCHARS];
        float   svar[MAXCHARS];
        float   imean[MAXCHARS];
        float   ivar[MAXCHARS];
        float   rating;
}value[MAXMODELS];

char *fileroot;
short numchars, nummodels,numchars;
```

```
int charfd;
```

*main*

```
main(argc,argv)
int argc;
char *argv[];
{
        int infd;
        short spk, i , totalsamples;
        int num;
        float impmean, impvar;
        register samples;
        if(argc < 3)
                exit(printf("Usage:        %s charfile output_file_root stat_files\n",argv[0]));
        charfd = open(argv[1],0);
        if(charfd < 0)
                exit(printf("Can't open '%s'\n",argv[1]));
        argv++; argc--;
        fileroot = argv[1];
        argv += 2;
        argc -=2;
        totalsamples = 0;
        spk = 0;
        while(argc--){
                infd = open(*argv, 0);
                if(infd < 0)
                        exit(printf("Can't open '%s'\n",*argv));
                if( read(infd, &stats, sizeof stats) != sizeof stats)
                        exit(printf("Read error on '%s'\n",*argv));
                if(spk == 0)
                        numchars = stats.numchars;
                if(stats.numchars != numchars)
                        exit(printf("Expecting %d characters, got %d in '%s'\n",
                                numchars, stats.numchars, *argv));
                samples = stats.numsegments;
                numsamples[spk] = samples;
                totalsamples += samples;
                for(i=0; i<numchars; i++){
                        value[spk].smean[i] = stats.sumx[i]*0.08;/*the div samples */
                        value[spk].svar[i] = stats.sumxx[i]*0.08*0.08;/*will be done later*/
                }
                nummodels++;
printf(" %s: spk %d: %d models,%d samples, total samples = %d\n",
                        *argv, spk, nummodels,samples,totalsamples);
                argv++;
                spk++;
        }
        fill_imposter();
        fill_spk_data();
/*      printdata();*/
        outputmodels();
}
```

*fill_imposter*

```
fill_imposter()
{
        register spk, samples,chars,imp;
        int num;
        float impmean, impvar, var;
printf("numchars = %d nummodels = %d\n",numchars, nummodels);
        for(spk=0; spk < nummodels; spk++){
                samples = impostersamples(spk);
                for(chars = 0; chars < numchars; chars++){
                        impmean = 0;
                        impvar = 0;
                        for(imp=0; imp < nummodels; imp++){
                                if(imp != spk){
                                        impmean += value[imp].smean[chars];
                                        impvar += value[imp].svar[chars];
                                }
                        }
                        impmean /= samples;
                        impvar /= samples;
```

```
            impvar -= impmean*impmean;
            value[spk].imean[chars] = impmean;
            value[spk].ivar[chars] = sqrt(impvar);
        }
    }
} fill_spk_data()                                                     fill_spk_data
{
    register spk, chars, samples;
    float mean, var;
    printf("numchars = %d nummodels = %d\n",numchars, nummodels);
    for(spk=0; spk < nummodels; spk++){
        samples = numsamples[spk];
        for(chars = 0; chars < numchars; chars++){
            value[spk].smean[chars] /= samples;
            mean = value[spk].smean[chars];
            var = value[spk].svar[chars] /samples;
                                                                    ...fill_spk_data var -= mean*mean;
            value[spk].svar[chars] = sqrt(var);
        }
    }
} printdata()                                                         printdata
{
    register spk, chars;
    float factor, imean, smean, ivar, svar;
    printf("numchars = %d nummodels = %d\n",numchars, nummodels);
    for(chars = 0; chars < numchars; chars++){
        printf("char %3d\n", chars);
        for(spk=0; spk < nummodels; spk++){
            printf(" spk %3d", spk);
            factor = 0;
            smean = value[spk].smean[chars];
            imean = value[spk].imean[chars];
            svar = value[spk].svar[chars];
            ivar = value[spk].ivar[chars];
            if(smean > (0.9 * imean))
                factor = 4.0 * (smean - imean) - (svar + ivar);
            printf(" f = %4.2f", factor);
            printf(" smean = %4.1f",smean);
            printf(" svar = %4.2f", svar);
            printf(" imean = %4.1f",imean);
            printf(" ivar = %4.2f", ivar);
            printf("\n");
        }
    }
}
impostersamples(spk)                                                impostersamples
int spk;
{
/*          return the number of imposter samples for spk           */
    int total,i;
    total = 0;
    for(i=0; i< nummodels; i++){
        if(i != spk)
            total += numsamples[i];
    }
    printf("%d imposter samples for spk %d\n", total, spk);
    return(total);
}
outputmodels()                                                      outputmodels
{
    struct fvalue fvalue[MAXCHARS];
    int spk, chars, mfd;
    char str[100];
    for(spk = 0; spk < nummodels; spk++){
```

```
          if( (spk+1) < 10)
                  sprintf(str, "%s.0%d", fileroot, spk+1);
          else
                  sprintf(str, "%s.%d", fileroot, spk+1);
          printf("opening model '%s'\n", str);
          mfd = creat(str, 0444);
          sortchar(spk, fvalue);
          printf("Characters for Spk %d\n", spk);
          for(chars=0; chars < 40; chars++){
                  writechar(mfd, fvalue[chars].charnum);
                  printf("%d        %4.2f\n",fvalue[chars].charnum,
                                          fvalue[chars].factor);
```
...outputmodels
```
          }
                  close(mfd);
          }
  } sortchar(spk, fvalue)
  int spk;
  struct fvalue fvalue[MAXCHARS];
  {
```
sortchar
```
          int sortcompare();
          register chars;
          register float smean, imean;
          float svar, ivar, f;
          for(chars = 0; chars < numchars; chars++){
                  fvalue[chars].charnum = chars;

f = 0;
                  smean = value[spk].smean[chars];
                  imean = value[spk].imean[chars];
                  svar = value[spk].svar[chars];
                  ivar = value[spk].ivar[chars];
                  if(smean > (0.9 * imean))
                          f = 4.0 * (smean - imean) - (svar + ivar);

fvalue[chars].factor = f;
          }
          qsort(fvalue, numchars, sizeof fvalue[0], sortcompare);
  } sortcompare(el1, el2)
  struct fvalue *el1, *el2;
  {
```
sortcompare
```
          float f1, f2;
          f1 = el1->factor;
          f2 = el2->factor;
          if(f1 > f2)
                  return(-1);
          if(f1 == f2)
                  return(0);
          return(1);
  }
  writechar(mfd, charnum)
  int mfd, charnum;
  {
```
writechar
```
          struct block{
          float junk;
          float hits;
          float R[13];
          float B[13];
          }       character;
```

```
int rsize;

lseek(charfd, (long)(charnum * (sizeof character)), 0);
rsize = read(charfd, &character, sizeof character);
if(rsize != sizeof character)
        exit(printf("Can't Read the character file\n"));
rsize = write(mfd, &character, sizeof character);
if(rsize != sizeof character)
        exit(printf("Can't Write the Model file\n"));
}
```

We claim:

1. A method of recognizing an unknown speaker as one of a plurality of speaker candidates from portions of speech of each of said speaker candidates and said unknown speaker comprising the steps of:

converting digitized samples of said portions of speech of said speaker candidates into frames of speech, each frame representing a point in a preselected multi-dimensional speech space:

generating a character set representative of said speech space comprising a plurality of characters selected from said frames of speech of all of said speaker candidates:

generating a speaker model of each of each speaker candidates, said speaker model comprising a plurality of model characters selected from said character set and representative of an associated speaker's voice characteristics;

converting digitized samples of said portions of speech of said unknown speaker into frames of speech; and comparing said frames of speech from said unknown speaker with said speaker models to determine which one of said speaker candidates has the greatest likelihood of being said unknown speaker.

2. The method of claim 1 wherein said portions of speech of said speaker candidates are provided over a first communication channel and said portion of speech of said unknown speaker provided over a second communication channel having different characteristics from said first communication channel; and said method further comprises the step of: performing blind deconvolution of the digitized samples of both the speaker candidates' and unknown speaker's portions of speech before converting them into frames of speech.

3. The method of claim 1 wherein said preselected multi-dimensional speech space is a 12 coefficient linear predictive code (LPC-12) speech space.

4. The method of claim 1 wherein each of said characters in said character set is separated in said speech space from all other characters in said character set by a predetermined minimum distance.

5. The method of claim 4 wherein said predetermined mininum distance is 1.5 Itakura units.

6. The method of claim 1 wherein the step of generating a speaker model comprises the steps of:

dividing each of said portions of speech of each of said speaker candidates into a plurality of speech segments, each segment comprising a plurality of frames:

determining character frequency of occurrence data for each segment which is the number of times in a selected segment that each character in the character set is the closest character to the frames of said selected segment:

generating character occurrence statistics which comprises:

selecting one of the speaker candidates as the speaker and setting the remainder of said speaker candidates collectively as an imposter:

calculating for each character in the character set the mean frequency of occurrence and standard deviation (std) across all speaker segments and the mean frequency of occurrence and standard deviation (std) across all imposter segments from the character frequency of occurrence data, and selecting a smaller plurality of model characters from said character set based on said character occurrence statistics.

7. The method of claim 6 wherein the step of selecting model characters comprises selecting N characters having the top N f values, where N is any integer and f is determined as below:

if the speaker mean $>0.9$ the imposter mean, then f=4 * (Speaker mean−Imposter mean)−(Speaker std & Imposter std).

8. The method of claim 7 wherein N is less than or equal to 40.

9. The method of claim 1 wherein the step of generating a speaker model further comprises the steps of:

dividing each of said portions of speech of said speaker candidates into a plurality of speech segments, each segment comprising a plurality of frames;

determining the distance, D, from each frame in each segment to the closest model character for each plurality of model characters associated with a speaker candidate:

saving the distance, D, in a model histogram for each speaker candidate for each segment of speech;

operating on each model histogram to select an optimum value of "D" such that at least a majority of input frames have distances greater than "D";

selecting one of the speaker candidates as speaker and setting the remainder of said speaker candidates collectively as an imposter;

calculating the mean distance value of "D" and standard deviation (std) across all speaker segments and the mean distance value of "D" and standard deviation (std) across all imposter segments from the optimum "D" values; and appending said mean distance values and std's to each plurality of model characters of an associated speaker candidate.

10. The method of claim 9 wherein the step of operating on each model histogram comprises:

finding the distance value "D" from said histogram such that 30% of the frames had distances less than "D" and 70% of the frames had distances greater than "D".

11. The method of claim 9 wherein the step of comparing said frames of speech from said unknown speaker with said speaker models further comprises:

determining the distance, D, from each frame from said unknown speaker to the closest model character for each plurality of model characters associated with a speaker candidate;

saving the distance, D, in a model histogram for each speaker candidate:

operating on a selected model histogram to select an optimum value of "D" such that at least a majority of input frames have distances greater than "D";

using said "D" value and an associated speaker model's mean and std values to calculate the probability that the associated speaker candidate would produce distance "D" (Prob (D/Spk)) and the probability that the imposter would produce distance "D" (Prob (D/Imp)):

form and save the likelihood ratio Prob (D/Spk)/Prob (D/Imp):

repeat the above steps of using said "D" values and forming and saving said likelihood ratio for each of said speaker models; and choosing said speaker which has the highest likelihood ratio as said unknown speaker.

12. The method of claim 9 wherein the step of operating on a selected model histogram comprises:

finding the distance "D" such that 30% of the frames had distances less than "D" and 70% of the frames had distances greater than "D".

13. An apparatus for recognizing an unknown speaker as one of a plurality of speaker candidates from portions of speech of each of said speaker candidates and unknown speaker comprising:

means for sampling and digitizing said portions of speech to produce digitized samples:

means for converting said digitized samples into frames of speech, each frame representing a point in a multi-dimensional speech space:

means for generating a speaker model of each of said speaker candidates, said speaker model comprising a plurality of model characters selected from said frames of speech associated with a speaker candidate's portion of speech and representative of said speaker candidates voice characteristics; and means for comparing said frames of speech from said unknown speaker with said speaker models to determine which one of said speaker candidates has the greatest likelihood of being said unknown speaker.

14. The apparatus of claim 13 wherein said means for generating a speaker model further comprises:

means for generating a character set having a plurality of characters from said frames of speech of all of said speaker candidates which characters are representative of said speech space wherein each of said characters in said character set is separated in said speech space from all other characters in said character set by a predetermined minimum distance; and means for selecting said model characters for each of said speaker candidates from said character set.

15. The apparatus of claim 13 wherein said apparatus further comprises means for channel normalization when said portions of speech of said speaker candidates are received over a separate and different channel from said portion of speech of said unknown speaker whereby said apparatus is still capable of recognizing said unknown speaker.

16. The apparatus of claim 15 wherein said means for channel normalization comprises means for blind deconvolution of said digitized samples.

* * * * *